(12) United States Patent
Sugiyama et al.

(10) Patent No.: US 7,620,614 B2
(45) Date of Patent: Nov. 17, 2009

(54) METHOD, PROGRAM AND APPARATUS FOR DOCUMENT RETRIEVAL SYSTEM

(75) Inventors: Kazunari Sugiyama, Kawasaki (JP); Tadataka Matsubayashi, Machida (JP); Katsushi Yako, Yokohama (JP); Yasufumi Sato, Funabashi (JP); Jugo Noda, Ikeda (JP); Nobuo Kawamura, Atsugi (JP)

(73) Assignee: Hitachi, Ltd., Tokyo (JP)

( * ) Notice: Subject to any disclaimer, the term of this patent is extended or adjusted under 35 U.S.C. 154(b) by 139 days.

(21) Appl. No.: 11/625,983

(22) Filed: Jan. 23, 2007

(65) Prior Publication Data
US 2007/0192274 A1    Aug. 16, 2007

(30) Foreign Application Priority Data
Jan. 30, 2006   (JP) ............................. 2006-020460

(51) Int. Cl.
G06F 17/30  (2006.01)
G06F 12/00  (2006.01)

(52) U.S. Cl. .................... 707/1; 707/2; 707/3; 707/200

(58) Field of Classification Search ................. 707/1, 707/2, 3, 200
See application file for complete search history.

(56) References Cited

U.S. PATENT DOCUMENTS 6,314,418 B1 * 11/2001 Namba .......................... 707/2
2003/0116401 A1 * 6/2003 Ishida et al. ................. 194/302
2004/0236831 A1 * 11/2004 Ohto et al. ................... 709/204
2005/0129042 A1 * 6/2005 Muhonen et al. ............ 370/412

FOREIGN PATENT DOCUMENTS

JP    2003-030197    1/2003

* cited by examiner

*Primary Examiner*—Etienne P LeRoux
*Assistant Examiner*—Cindy Nguyen
(74) *Attorney, Agent, or Firm*—Antonelli, Terry, Stout & Kraus, LLP.

(57) ABSTRACT

The present invention realize a high speed retrieval performance in a document retrieval system referring to partial data of documents including structured data such as XML documents and electric mails, without providing further memory. The present invention includes storage means for storing documents to be retrieved onto a disk device, a calculation means for calculating an allocated capacity of the memory, and storage means for saving, onto the memory, partial data of the documents stored on the disk device by the calculated allocated capacity of the memory. The present invention also includes a first retrieval means for retrieving partial data stored on the memory, determining means for determining whether or not to retrieve the documents stored on the disk device based on the result from the first retrieval, and a second means for retrieving the documents stored on the disk device based on the result from the above determination.

16 Claims, 18 Drawing Sheets

METHOD, PROGRAM AND APPARATUS FOR DOCUMENT RETRIEVAL SYSTEM

CROSS-REFERENCE TO RELATED APPLICATION

This application claims the benefit of Japanese Patent Application No. 2006-020460 filed on Jan. 30, 2006, the disclosure of which is incorporated herein by reference.

BACKGROUND OF THE INVENTION

1. Field of the Invention

The present invention relates to a technique for providing a high speed retrieving operation for electric documents even if an available memory capacity is limited.

2. Description of the Related Prior Art

It is not difficult to imagine that more electric documents will continuously increase as more information equipment or apparatus such as PC (Personal Computer), with which those documents are created, are increasingly used. Considering this tendency, there have been more requests for a full text document retrieval system that retrieves target documents for tremendous amount of documents.

In addition, recently, there have been increasingly requested for retrieving particular content included in an electric mail such as a sender and its title, or for retrieving content included in a particular logical structure identified by a particular tag (herein a "tag" denotes a name of a structure, such as "title", "body", "author", "date", as described later) of XML (eXtensible Markup Language) documents. In order to meet the above requests, there have been developed document retrieval systems for providing a retrieving operation in documents with limiting retrieving range or structures of the document. A scan-type full text document retrieving scheme is included in such a document retrieval system. This scheme scans data stored on disks or memories so as to retrieve documents that a searcher desires (hereinafter referred to as "target documents"). For example, a technique is disclosed in JP 2003-30197A in which whole documents are stored on memories of a document retrieval system, so that a full text document retrieving operation can be provided at a high speed.

However, a document retrieval system usually has a limited memory capacity. It is difficult to apply the conventional technique as disclosed in JP 2003-30197A directly to such a case that a size of target documents to be retrieved is greater than the memory capacity of the system. This case may require additional memories for the document retrieval system so that the memories for the system can accept the size of the documents, or may require an additional retrieving operation for the disks as well as the memories in the system. The requirement of additional memories may increase cost, and the requirement of the additional retrieving operation for the disk may increase time depending on the number of documents to be retrieved for the disks.

In order to solve the above-mentioned difficulties, the present invention provides a high speed document retrieving operation in a case of retrieving documents constituted of structured data even if available memory capacities are limited.

SUMMARY OF THE INVENTION

One aspect of the present invention provides a method for performing a document retrieval system including an input unit receiving a query condition about retrieving documents; a document retrieval computing-apparatus for retrieving documents based on the query condition; and an output unit for outputting a result from retrieving the documents.

The document retrieval computing-apparatus includes a first storage unit; a second storage unit; and a processing unit. In the document retrieval computing-apparatus, the second storage unit stores documents to be retrieved, and data of the stored documents is readable by the processing unit from the first storage unit faster than from the second storage unit.

The method for performing the system of retrieving documents includes following steps: by using the processing unit, acquiring available data storage capacity on the first storage unit; extracting data by the acquired available data storage capacity from each of the documents to be retrieved stored on the second storage unit; and storing the extracted data as partial document of the target document onto the first storage unit.

Through a first retrieval of the partial documents stored on the first storage unit, the processing unit extracts documents that meet the query condition received through the input unit from the documents to be retrieved. For those documents that are determined not to meet the query condition based on a result from the first retrieval, through a second retrieval of the documents to be retrieved stored on the second storage unit, the processing unit extracts documents that meets the query condition from the documents to be retrieved stored on the second storage unit. As results from the first and second retrievals, the processing unit outputs, through the output unit, the documents to be retrieved that are determined to meet the query condition as hit documents, which are extracted through the first and second retrievals.

Another aspect of the present invention provides a storage medium for storing programs for executing the above method.

Furthermore, another aspect of the present invention provides a document retrieval computing-apparatus included in a system of retrieving documents, which includes an input unit receiving a query condition about retrieving documents, the document retrieval computing-apparatus for retrieving documents based on the query condition, and an output unit for outputting results from retrieving the documents.

The document retrieval computing-apparatus includes a first storage unit, a second storage unit, and a processing unit, in which the second storage unit stores documents to be retrieved, and data of the stored documents is readable by the processing unit from the first storage unit faster than from the second storage unit.

The processing unit acquires available data storage capacity on the first storage unit; extracts data by the acquired available data storage capacity from the documents to be retrieved stored on the second storage unit; and stores the extracted data as partial documents of the documents to be retrieved onto the first storage unit. Through a first retrieval of the partial documents stored on the first storage unit, the processing unit extracts the documents that meet the query condition received through the input unit from the documents to be retrieved. For the documents that are determined not to meet the query condition based on a result from the first retrieval, through a second retrieval of the documents to be retrieved stored on the second storage unit, the processing unit extracts the documents that meet the query condition from the documents to be retrieved stored on the second storage unit. As results from the first and second retrievals, outputting through the output unit the documents to be retrieved that are determined to meet the query condition as hit documents, which are extracted through the first and second retrievals.

BRIEF DESCRIPTION OF THE DRAWINGS

FIG. 15 is a PAD showing how processes are performed by a partial document optimizing control program of the fourth embodiment.

DETAILED DESCRIPTION OF PREFERRED EMBODIMENTS

First Embodiment

Figure 1:
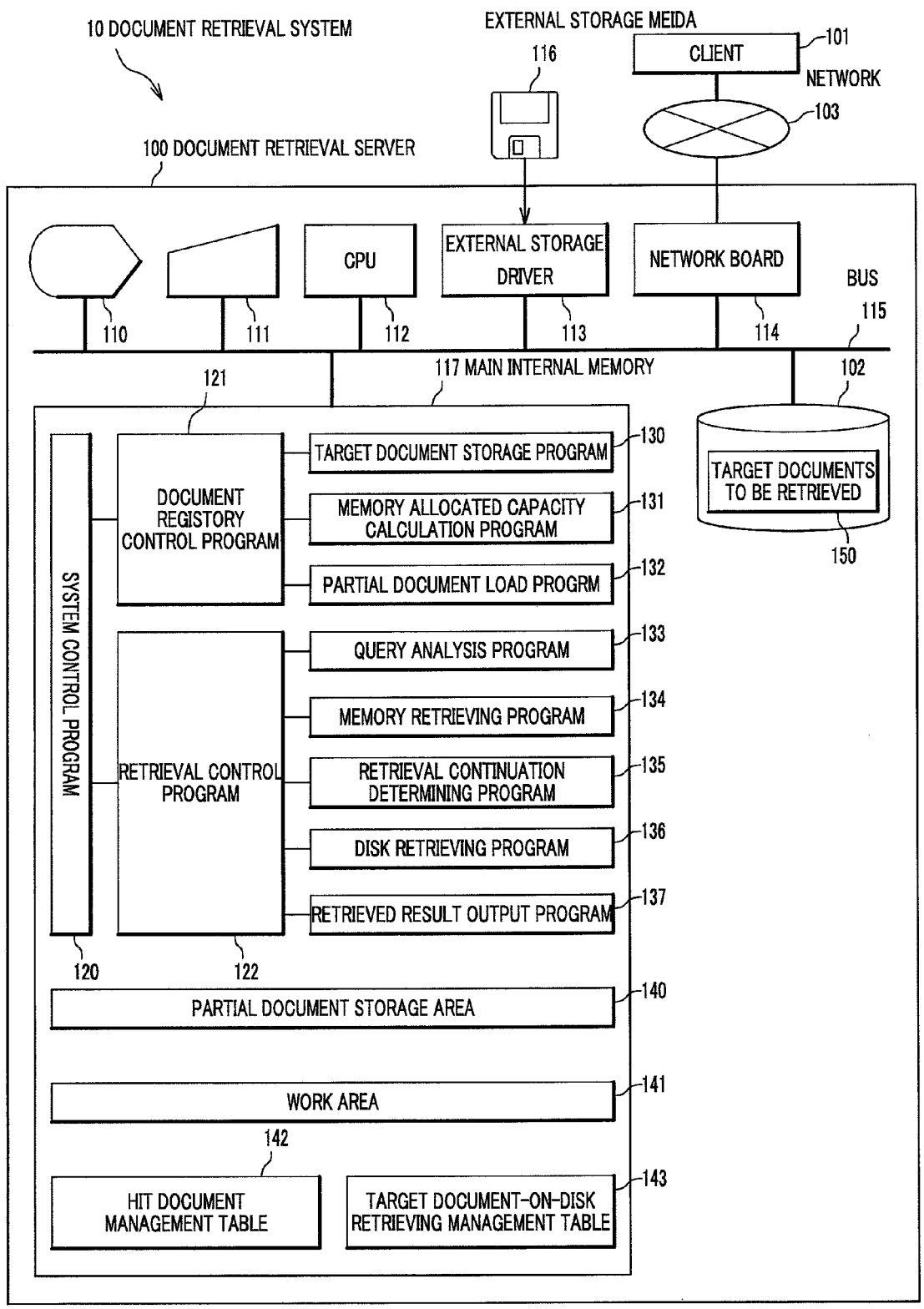
FIG. 1 is a block diagram showing a configuration of a document retrieval system according to the first embodiment.

Hereinafter, explanations will be given on a first embodiment of the present invention, with reference to FIG. 1.

A document retrieval system 10 includes a document retrieval server (also referred to as a "document retrieval computing apparatus") 100, at least one client 101, and a network 103 which connects the above components with one another.

Hereinafter, descriptions will be given on a configuration of the document retrieval server 100.

The document retrieval server 100 includes a magnetic disk device 102, a display 110, a keyboard 111, a CPU (Central Processing Unit) 112, an external storage driver 113, a network board (Ethernet Board™) 114, an main internal memory 117 and a bus 115 which connect the above component with one another.

Information stored on external storage media 116 is read onto the main internal memory 117 via the external storage driver 113 by the CPU 112 of the document retrieval server 100, and then is stored on the magnetic disk device 102 via the bus 115. The main internal memory 117 of the document retrieval server 100 reads and stores a system control program 120 including various programs from the magnetic disk device 102, and areas for partial document storage area 140, work area 141, a hit document management table 142, and a target document-on-disks management table 143 are secured on the main internal memory 117.

As shown in FIG. 1, the system control program 120 includes a document registry control program 121 and a retrieval control program 122.

The document registry control program 121 includes a target document storage program 130, a memory allocated capacity calculation program 131, and a partial document load program 132.

The retrieval control program 122 includes a query analysis program 133, a data-on-memory retrieving program 134, a retrieval continuation determining program 135, a data-on-disk retrieving program 136 and a retrieved result output program 137.

The document registry control program 121 and the retrieval control program 122 are activated by the system control program 120 in accordance with an instruction from the client 101 via the keyboard 111 and the network 103, so that the document registry control program 121 controls the target document storage program 130, the memory allocated capacity calculation program 131, the partial document load program 132, the query analysis program 133, the data-on-memory retrieving program 134, the retrieval continuation determining program 135, the data-on-disk retrieving program 136 and the retrieved result output program 137.

Figure 7:
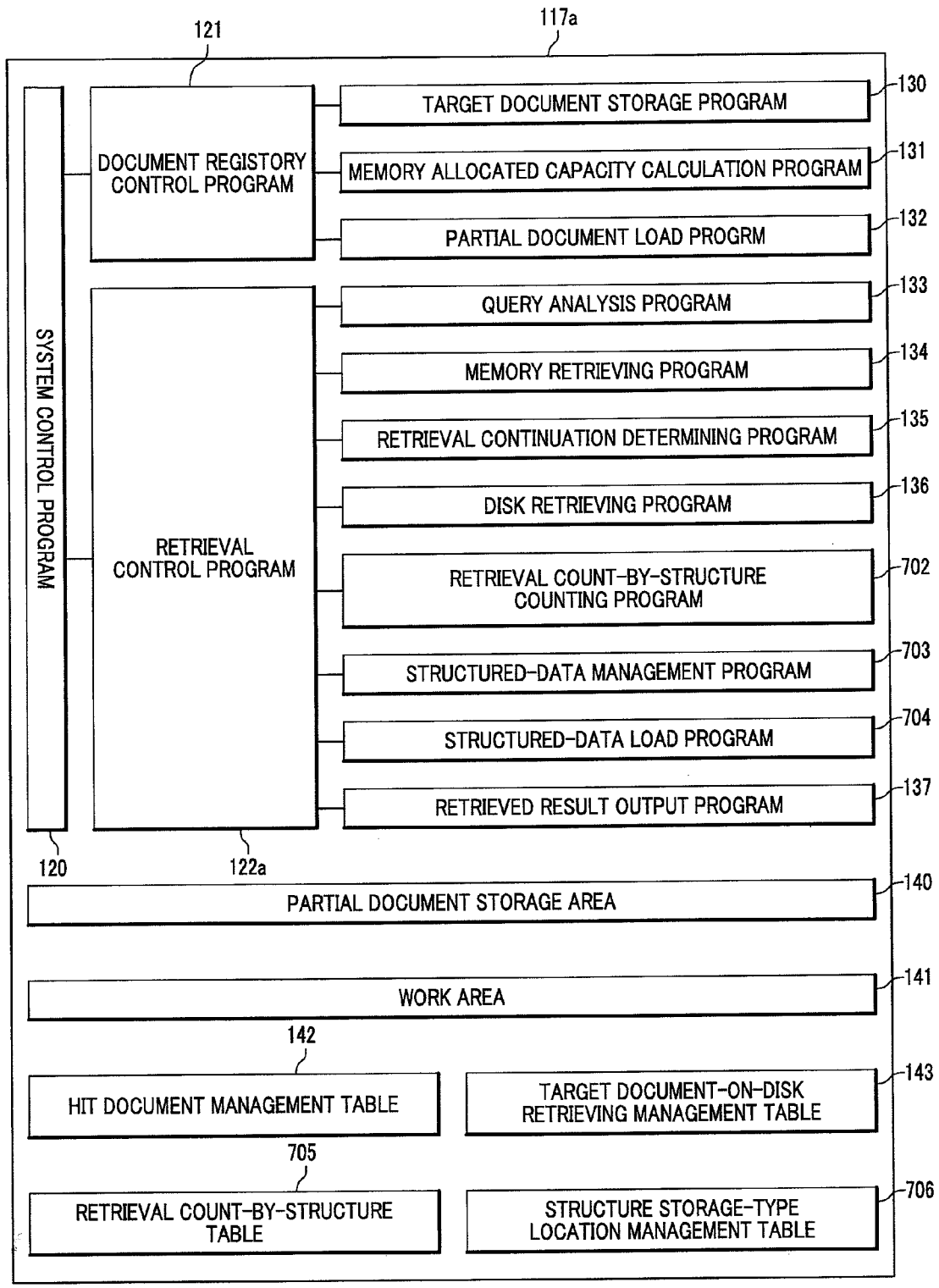
FIG. 7 is a block diagram showing a configuration of a main internal memory of a document retrieval system according to the second embodiment.

The magnetic disk device 102 is a kind of a secondary storage device and stores target documents 150 as well as the system control program 120 including the various programs 121, 122, 130 to 137. Note that FIG. 7 shows a status in which the system control program 120 including the various programs 121, 122, 130 to 137 are read from the magnetic disk device 102, and stored on the main internal memory 117.

The document retrieval server 100 is configured as described above.

In the present embodiment, the document registry control program 121 and the retrieval control program 122 are activated in accordance with the instruction (or command) inputted from the client 101 connected via the keyboard 111 and the network 103 to the document retrieval server 100, and those programs 121 and 122 may also be activated in accordance with an instruction or an event inputted through other input devices.

The programs 121 and 122 may be stored on storage means (not shown in the drawings) such as the external storage media 116, MO (Magneto-Optical disk), CD-ROM (Compact Disk Read Only Memory) and DVD (Digital Versatile Disk), and the PCU 112 of the document retrieval server 100 reads the programs 121 and 122 onto the main internal memory 117 of the document retrieval server 100 so as to execute the programs.

It may also be feasible that the programs 121 and 122 are read onto the main internal memory 117 of the document retrieval server 100 so as to be executed by the CPU 112 of the document retrieval server 100.

In the present embodiment, the target documents 150 are stored on the magnetic disk device 102. However, the target documents 150 may also be stored on the main internal memory 117 of the document retrieval server 100, or on storage media (not shown in the drawings) such as the external storage media 116, MO and CD-ROM, DVD and read onto the main internal memory 117 of the document retrieval server 100, so as to be processed. The magnetic disk device 102 storing the target documents 150 may be connected via the network 103 to the main internal memory 117 of the document retrieval server 100.

According to the present embodiment, the work area 141 of the document retrieval server 100 is secured on the main internal memory 117, and may also be secured on the magnetic disk device 102 or on writable storage media such as the external storage media 116, MO, CD-R (Compact Disk Recordable) and DVD.

According to the present embodiment, the document retrieval server 100 and the client 101 are constituted as a physically separated device, and may also be constituted as a physically integral device.

Hereinafter, descriptions will be given on processes of the document retrieval system 10 according to the present embodiment.

Figure 2:
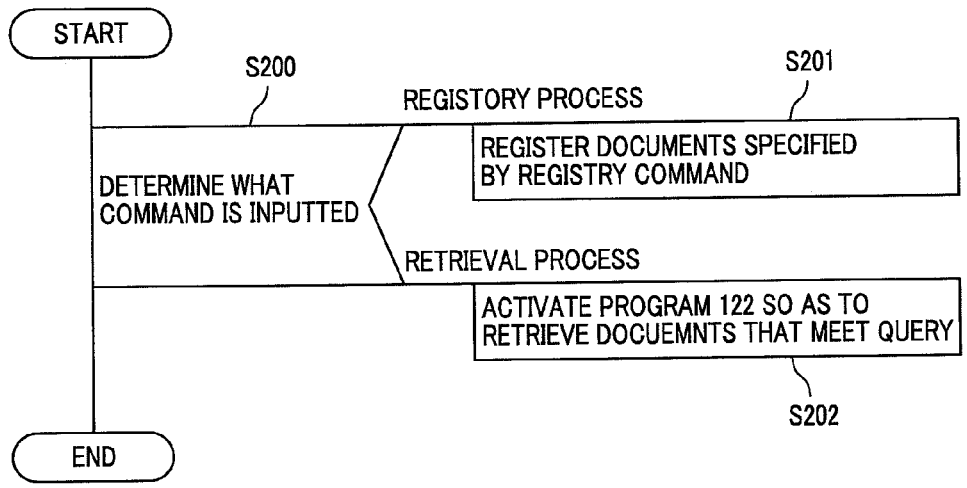
FIG. 2 is a PAD showing how processes are performed by a system control program of the first embodiment.

First, a process of the system control program 120 of the document retrieval server 100, with reference to a PAD (Problem Analysis Diagram) of FIG. 2 (see FIG. 1 if necessary).

The system control program 120 determines what command is inputted from the keyboard 111 (S200). If the system control program 120 determines that the inputted command is for registering specified documents ("registry process" at S200), the system control program 120 activates a document registry control program 121 and registers documents that are specified in the registry command (S201).

If determining that the inputted command is for retrieving the documents ("retrieval process" at S200), the system control program 120 activates the retrieval control program 122 so as to retrieve documents that meet the query condition specified in the retrieving command (S202).

The processes executed by the system control program 120 of the document retrieval server 100 are performed as described above.

Next, processes executed by the document registry control program 121 activated by the system control program 120 at S201 as shown in FIG. 2 will be described with reference to a PDA of FIG. 3 (see FIG. 1 if necessary).

The document registry control program 121 activates the target document storage program 130, and stores target documents to be retrieved onto the magnetic disk device 102 as the target documents 150 (S300). The target documents to be retrieved may be acquired from the external storage media 116 via the external storage driver 113, or may be acquired from the client 101 or external devices via the network 103.

Next, the document registry control program 121 activates the memory allocated capacity calculation program 131, and acquires the number of the documents that are stored on the magnetic disk device 102 as the target document 150 and capacity of the partial document storage area 140, thereby to calculate an allocated capacity of the document per document (S301).

Then, the document registry control program 121 repeatedly performs a following process (S303) for each document stored as the target documents 150, selecting one by one from the stored documents (S302). The document registry control program 121 activates the partial document load program 132 so as to extract document data from the head thereof by the allocated capacity of the memory that has been calculated at S301 from the document selected at S302 as partial document, and store the data into the partial document storage area 140 (S303).

The processes executed by the document registry control program 121 are performed as described above.

Next, processes executed by the retrieval control program 122 activated by the system control program 120 at S202 of FIG. 2 will be described with reference to a PDA of FIG. 4 (see FIG. 1 if necessary).

First, the retrieval control program 122 activates the query analysis program 133 so as to analyze the query condition specified by the user (S400). The user may input the query from the client 101.

Next, the retrieval control program 122 repeatedly performs processes at S402 to S406 for each partial document stored in the partial document storage area 140, selecting one by one from the stored partial documents (S401).

The processes after S402 to S406 will be described. First, the retrieval control program 122 activates the data-on-memory retrieving program 134 so as to retrieve each partial document selected at S401 (S402). Next, based on a result from the retrieval process at S402, the retrieval control program 122 determines whether or not the selected partial document is a hit document (i.e. a document that meets the query condition) at S403. If it is determined that the partial document is a hit document (Yes at S403), the retrieval control program 122 sets a flag on a document ID corresponding to the hit document on the hit document management table 142 (S404). Note that the present invention exemplifies that: the flag values include "0" and "1", and "0" denotes a "document not to be outputted (as a retrieved result)", and "1" denotes a "document to be outputted (as a retrieved result)".

Based on the retrieved result at S402, if it is determined that the partial document is not a hit document (No at S403), the retrieval control program 122 activates the retrieval continuation determining program 135 so as to determine whether or not the retrieval processes are completed through a range specified in the query condition (S405). If it is determined that the retrieval processes are not completed yet through the range specified in the query condition (No at S405), the retrieval control program 122 records a document ID of the selected partial document on the target document-on-disk management table 143 (S406). Note that "the range specified in the query condition" specifically denotes a whole range of the structure specified in the query condition, herein.

Next, the retrieval control program 122 repeats processes S408 to S410 for each document ID stored on the target document-on-disk management table 143 selecting one by one from the document IDs stored on the target document-on-disk management table 143 (S407).

Descriptions will be given on how to perform the processes S408 to S410, as follows.

First, the retrieval control program 122 activates the data-on-disk retrieving program 136 so as to read document data of the target document corresponding to the selected document ID from the target documents 150 stored on the magnetic disk device 102 into the work area 141, and determine whether or not the read data of the target document meets the query condition 600 analyzed at S400 (S408). Then, the retrieval control program 122 determines whether or not the target document of the read data is a hit document (S409). If it is determined that the document of the read data is a hit document (Yes at S409), the retrieval control program 122 sets a flag on a document ID for the hit document on the hit document management table 142 (S410).

Then, the retrieval control program 122 activate the retrieved result output program 137 so as to refer to the hit document management table 142 and outputs documents with a flag of "1" (i.e. documents provided with a flag), as a retrieved result (S411).

As described above, the processes executed by the retrieval control program 122 are performed.

Hereinafter, specific explanations will be given on how the processes in the document retrieval system 10 according to the first embodiment are performed, with reference to FIGS. 5 and 6.

First, specific descriptions will be made on document registry processes (see FIG. 3) in the document retrieval system 10 according to the first embodiment, with reference to FIG. 5 (see FIGS. 1 and 3 if necessary).

Figure 5:
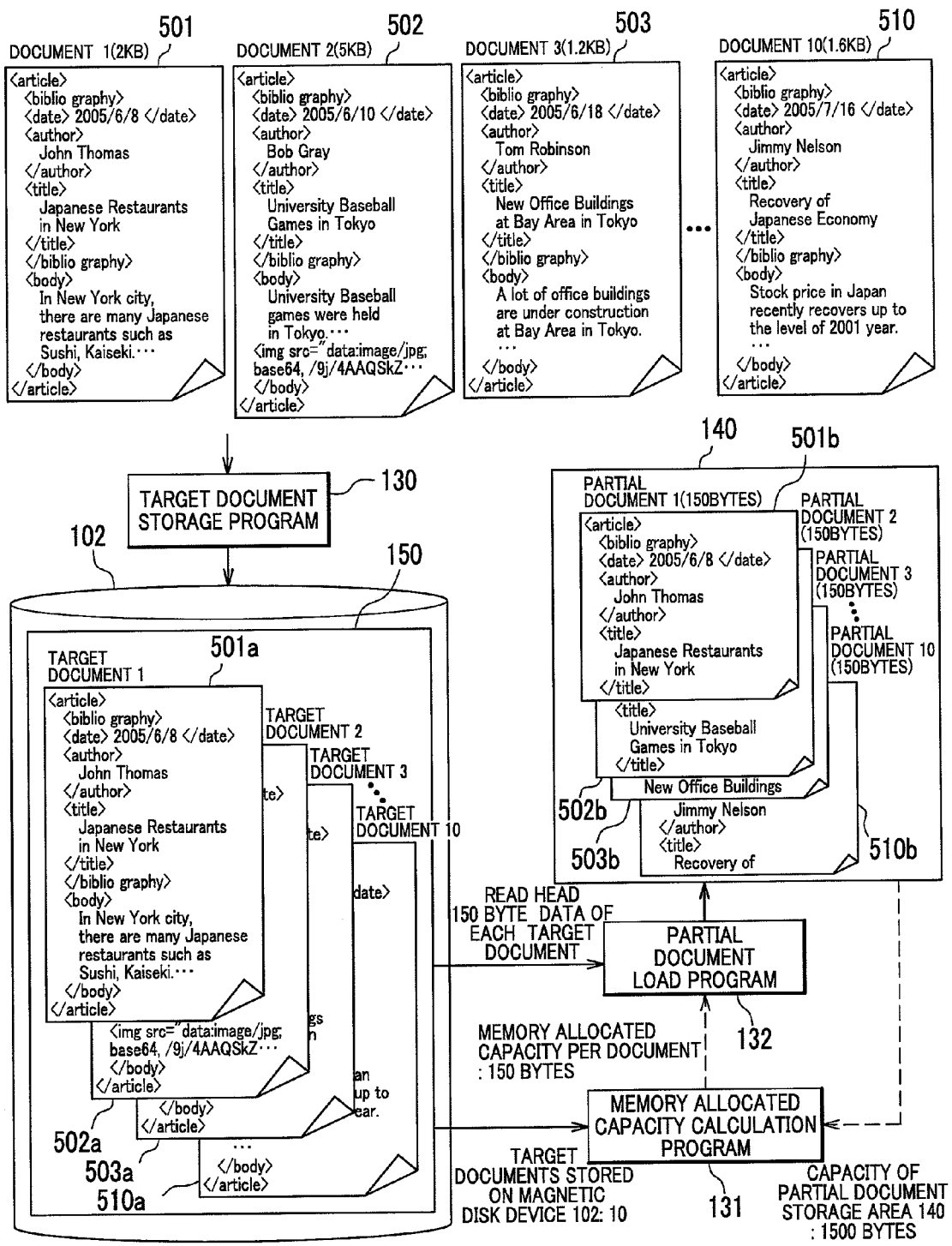
FIG. 5 shows how document registry processes according to the first embodiment are performed.

FIG. 5 shows a flow of processes for registering documents 1 to 10. The documents 1 to 10 include such contents as shown in the document 1 (501) to the document 10 (510) of FIG. 5. As a specific example, a document part defined with a <img> tag of the document 2 (502) indicates an image of a baseball player, which is encoded with BASE 64.

Figure 3:
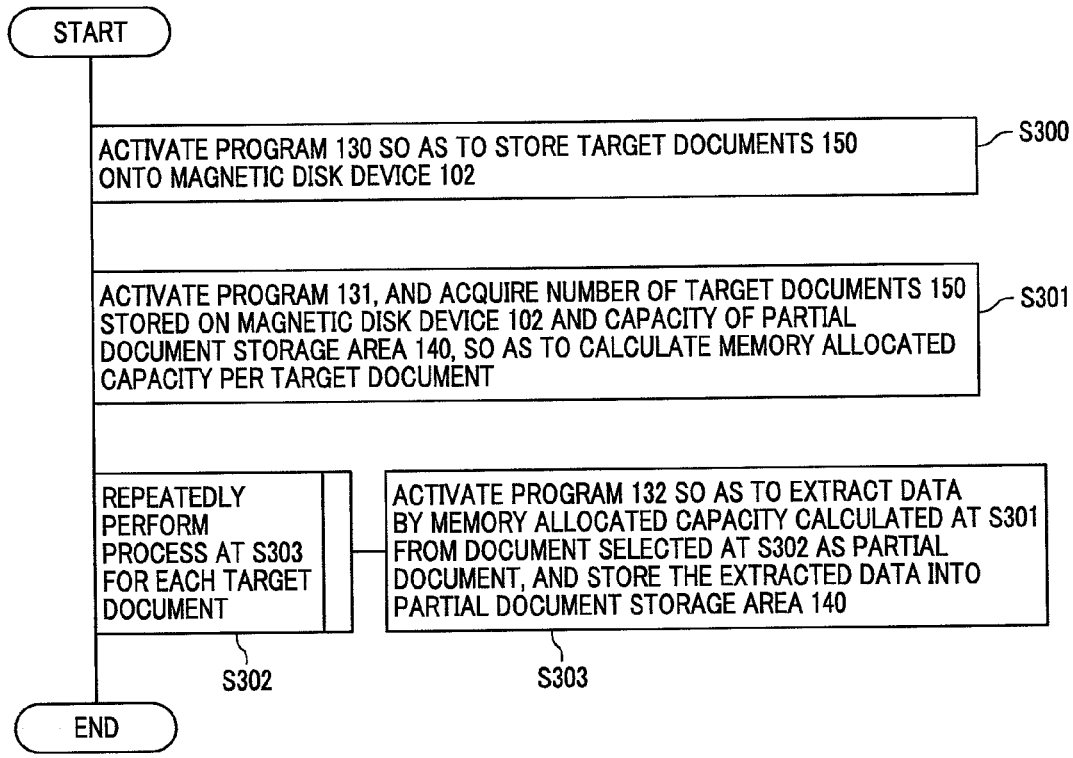
FIG. 3 is a PAD showing how processes are performed by a document registry control program of the first embodiment.

The example of FIG. 5 shows a status in which the processes at S300 of FIG. 3 is executed for each of the documents 1(501) to 10(510), and the target document storage program 130 stores the documents 1(501) to 10(510) as target documents 1(501*a*) to 10(510*a*) onto the magnetic disk device 102. Next, S301 of FIG. 3 is executed, and the memory allocated capacity calculation program 131 acquires the number of the target documents stored on the magnetic disk device 102 and the capacity of the partial document storage area 140 so as to calculate an allocated capacity of the memory that is allocated per document.

The example of FIG. 5 shows a status in which the number of the target documents (10 documents) stored on the magnetic disk device 102 and 1,500 bytes for the capacity of the partial document storage area 140 are acquired and the allocated capacity of the memory per document is 150 bytes (=1500 bytes/10).

Next, the process at S302 of FIG. 3 is executed, and the partial document load program 132 reads document data by the allocated capacity of the memory (calculated at S301) for each target document 150 that are stored on the magnetic disk device 102, and stores the read document data as a partial document in the partial document storage area 140.

In a more specific example as shown in FIG. 5, the magnetic disk device 102 stores ten target documents 150 (from a target document 1 (501*a*) to a target document 10 (510*a*)), and the head 150 byte data of each target document is read one by one into the partial document storage area 140 as a partial document 1 (501*b*) to a partial document 10 (150*b*), respectively.

The specific process flow of how to register documents in the document retrieval system according to the first embodiment is explained, as described above.

Specific descriptions will be made on how to perform the document retrieval processes in the document retrieval system according to the first embodiment, mainly referring to FIG. 6 (see FIGS. 1 and 4 if necessary), as follows.

Figure 6:
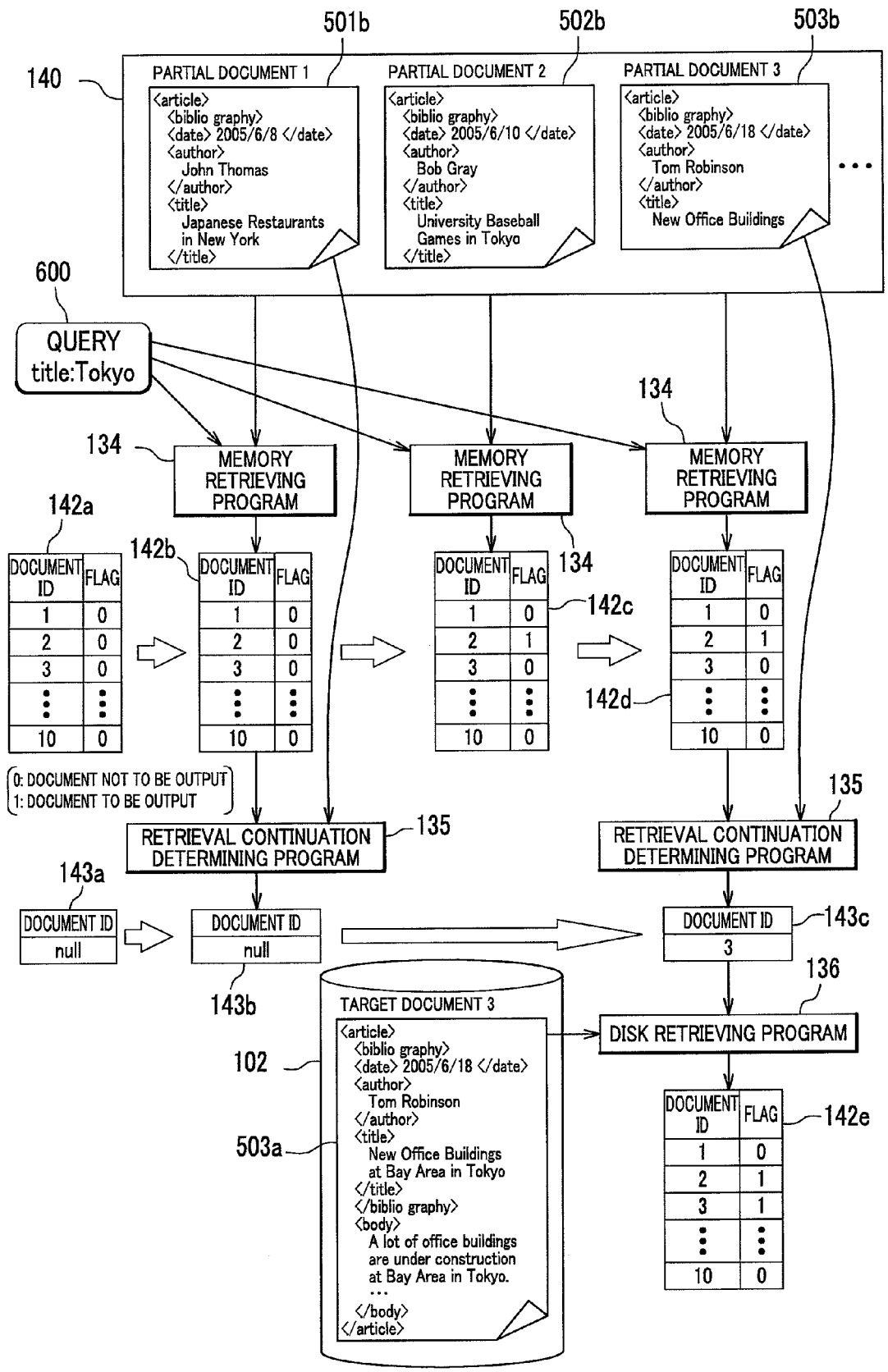
FIG. 6 shows how document retrieval processes according to the first embodiment are performed.

FIG. 6 shows a case in which "title: Tokyo" is specified as the query condition 600 for the document retrieval server 100 storing the documents 1 to 10. Note that the query condition 600 of "title: Tokyo" is a query that is specified for the document retrieval server 100 by the user so as to retrieve the target documents including a character string of "Tokyo" in a structure having a structure name (tag) of "title" thereof.

Figure 4:
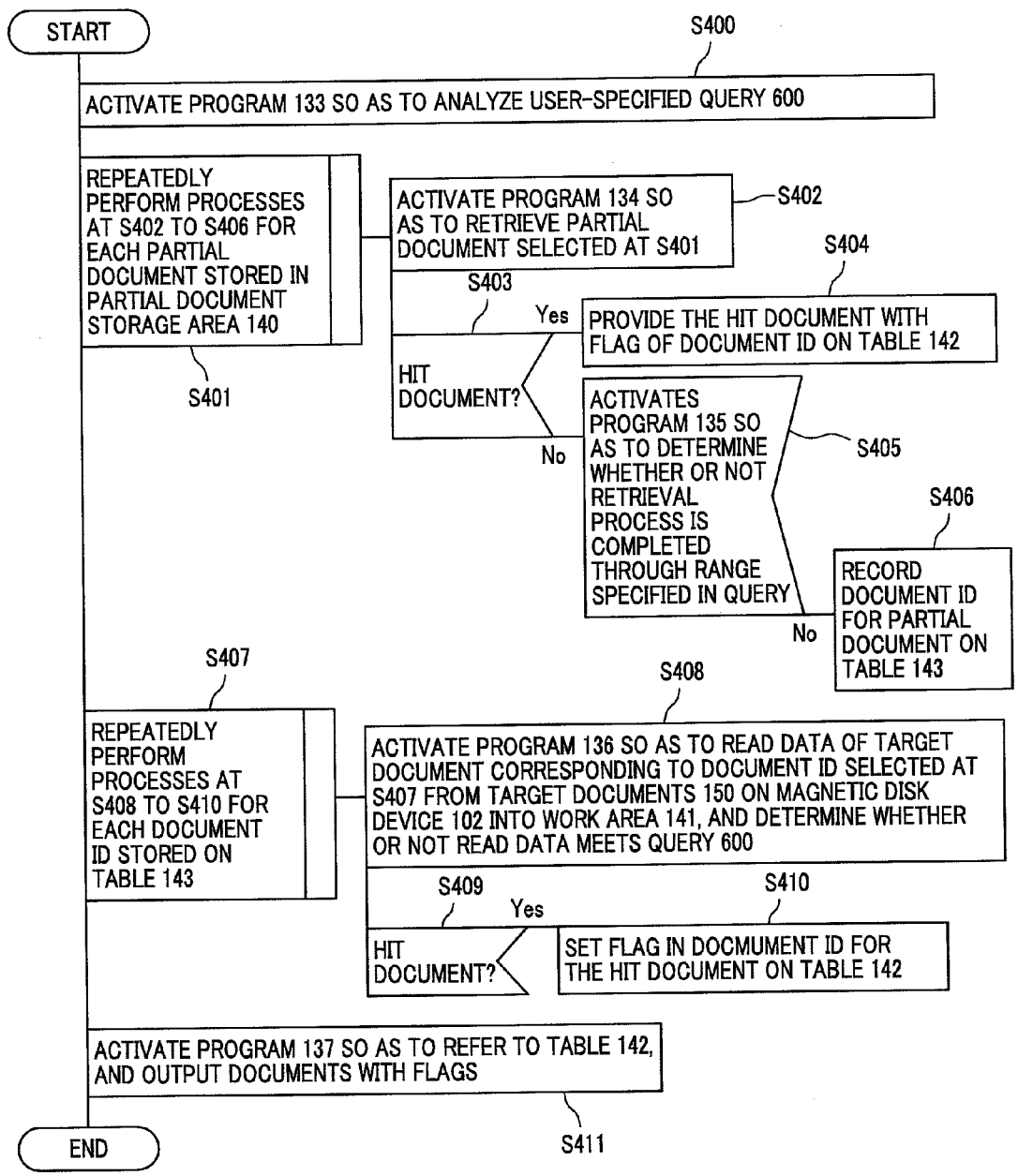
FIG. 4 is a PAD showing how processes are performed by a retrieval control program of the first embodiment.

The processes after S402 shown in FIG. 4 are repeatedly performed one by one for each partial document stored in the partial document storage area 140. Specific descriptions will be given on how to perform the processes after S402 as follow.

First, the process at S402 of FIG. 4 is executed for the partial document 1 (501*b*), at which the data-on-memory retrieving program 134 is executed so as to retrieve the partial document 1 (501*b*). Next, at S403, it is determined whether or not the partial document 1 (501*b*) is a hit document. The example of FIG. 6 shows a status in which the partial document 1 (501*b*) is not a hit document regarding the query condition 600 of "title: Tokyo", so that the hit document management table 142, without being updated, shifts a status thereof from 142*a* to 142*b*, in which the document ID="1" corresponding to the partial document 1 has a "0" flag. The process at S405 of FIG. 4 is executed, at which the retrieval continuation determining program 135 is activated so as to determine whether or not the retrieval processes are completed through the range specified in the query condition 600. The example of FIG. 6 shows a status in which, through the retrieval for the partial document 1 (501*b*), it is determined that the retrieval is completed through a range of "title" that has been specified in the query condition 600 of "title: Tokyo" (retrieval for the structure having a tag of "title" is completed). Accordingly there is nothing recorded on the target document-on-disk retrieving management table 143 (null), as indicated in the target document-on-disk management table 143 shifting a status thereof from 143*a* to 143*b* in FIG. 6.

Next, the process at S402 of FIG. 4 is executed for the partial document 2 (502*b*), at which the memory retrieving program 134 is activated so as to retrieve the partial document 2 (502*b*). The example of FIG. 6 shows a status in which the partial document 2 is a hit document regarding the query condition 600 of "title: Tokyo", so that the hit document management table 142 shifts a status thereof from 142*b* to 142*c*, in which the flag on the document ID="2" corresponding to the partial document 2 is updated from "0" to "1".

Further, the process at S402 in FIG. 4 is executed for the partial document 3 (503*b*), at which the memory retrieving program 134 is activated so as to retrieve the partial document 3 (503*b*). The example of FIG. 6 shows a status in which the partial document 3 (503*b*) is not a hit document regarding the query condition 600 of "title: Tokyo", so that the process at S405 of FIG. 4 is executed, at which the retrieval continuation determining program 135 is activated so as to determine whether or not the retrieval processes are completed through the range specified in the query 600. In a more specific example as shown in FIG. 6, based on the retrieved result for the partial document 3 (503*b*), it is determined that the retrieval process for the structure having a tag of "title" that has been specified in the query condition 600 of "title: Tokyo" is not yet completed (retrieval for the structure having a tag of "title" is not yet completed). Accordingly, the target document-on-disk management table 143 shifts to a status 143*c* thereof by updating the table 143 setting "3" for the document ID (S406 of FIG. 4).

The above-mentioned processes are repeatedly performed for up to the document 10.

Following the processes from S401 to S406, the process at S407 is executed, at which the processes after S408 are repeatedly performed one by one for each document ID recorded on the target document-on-disk management table 143.

The processes after S407 will be described as follows. First, the process at S408 shown in FIG. 4 is executed, at which the data-on-disk retrieving program 136 is activated so as to read data of a target document corresponding to the selected document ID from the target documents 150 stored on the magnetic disk device 102 into the work area 141. And then, it is determined whether or not the data of the target document read into the work area 141 meets the query condition 600 specified at S400 of FIG. 4. Next, at S409 of FIG. 4, it is determined whether or not the target document of the data is a hit document. If it is determined to be a hit document, the retrieval control program 122 sets a flag on a document ID corresponding to the target document of the data on the hit document management table 142 (see S410 of FIG. 4). In a more specific example as shown in FIG. 6, the status 143*c* of the target document-on-disk management table 143 indicates "3" for the document ID, so that data of the document corresponding to the document 3 (503*b*) is read from the target documents 150 stored on the magnetic disk device 102 into the work area 141, so as to execute the retrieval process for the document 3 (503*b*). Through the retrieval process, it is determined that the document 3 (503*b*) is a hit document, and the hit document management table 142 shifts a status thereof from 142*d* to 142*e*, in which the flag for the document ID="3" corresponding to the document of the data is updated from "0" to "1".

As described above, the explanations have been given on the first embodiment of the present invention.

The first embodiment of the present invention provides retrieval processes for partial documents, in which head part (head 150 byte data) of each document is stored as a partial document onto the memory and is retrieved. In such a case that structures to be retrieved are likely to be included in the head part of the documents, it is possible to complete the retrieval processes simply by performing the processes for the memory, thereby providing a high speed retrieval performance even if the document retrieval system has a smaller memory capacity. According to the first embodiment of the present invention, it is possible to provide a retrieval operation for those documents stored on the disks even before completing the retrieval operation for those partial documents stored on the memory. Therefore, it is obvious that the document retrieval system according to the present embodiment can provide a retrieval operation for a desired structure of the documents, as specified in the query condition.

Second Embodiment

Hereinafter, explanations will be provided on the second embodiment of the present invention, with reference to FIG. 7.

In the second embodiment, the explanations will be provided by using the identical references for components or processes having the identical functions as those of the first embodiment, and by using the similar references for components or processes having the similar functions as those of the first embodiment.

In a case in which the head part of the documents are stored on the main internal memory as shown in the first embodiment, whole structures to be retrieved are not always stored on the main internal memory, so that there may often occur such a situation in which the disks should be a location to be retrieved. A document retrieval system according to the second embodiment counts how many times each structure of the document is specified in the query condition (hereinafter referred to as "retrieval count"), and structures that are more frequently retrieved are stored on the main internal memory 117, thereby realizing a high speed retrieval performance of the document retrieval system.

The second embodiment employs approximately the same components as those of the first embodiment (FIG. 1) other than a configuration of a retrieval control program having a reference 122*a* and an main internal memory 117 having a reference 117*a* including a retrieval count-by-structure table 705 and a structure storage-type location management table 706 (FIG. 7). The retrieval control program 122*a* according to the second embodiment includes a retrieval count-by-structure counting program 702, a structured-data management program 703 and a structured-data load program 704. Other components of the retrieval control program 122*a* are the same as those of the retrieval control program 122 of the first embodiment.

Note that the document registry processes executed by the document registry control program 121 according to the second embodiment are the same as those of the first embodiment, as already explained in the PAD of FIG. 3. Therefore, explanations for the document registry processes in the present embodiment will be omitted.

Descriptions will be given on processes executed by the retrieval control program 122*a* different from those executed by the retrieval control program 122 of the first embodiment, with reference to a PAD in FIG. 8 (see FIG. 7 if necessary). The processes shown in FIG. 8 include processes S801, S802 and S803 that are different from the processes of the first embodiment. It is characterized that, the process at S801 of the second embodiment is for counting retrieval counts of logical structures (or structures) of the documents every time the data structure is specified in the user's query condition, therefore, the retrieval process may be eliminated depending on where the logical structure of the document locates. For example, if it is determined that a structure of the document specified in the query condition is not stored on the main internal memory 117*a*, it is possible to omit the retrieval process for the main internal memory 117*a* at S802. It is also characterized that the process at S803 provides a process of referring to a retrieval count table for managing retrieval count by structure of the documents, so as to change the order of the structures in the documents, depending on the retrieval frequency of the structure. Through this process, structures having more retrieval frequencies can be preferentially stored on the main internal memory 117*a*.

First, the retrieval control program 122*a* activates the query analysis program 133 so as to analyze the query condition specified by the user (S400). Next, the retrieval control program 122*a* activates the retrieval count-by-structure counting program 702 so as to count how many times each structure of the documents is specified in the query condition that has been analyzed at S400. In other words, the retrieval count-by-structure counting program 702 increases by 1 the count in each tag field of the retrieval count-by-structure table 705 every time the structure is specified in the query condition (S801).

Then, the retrieval control program 122*a* repeatedly performs processes at S802 to S406 for each partial document stored in the partial document storage area 140, by selecting one by one (S401).

Specific descriptions will be given on the processes after S802 as follow.

First, the retrieval control program 122*a* activates the structured-data management program 703 so as to determine where the structure locates, which is specified in the query condition that has been analyzed at S400, referring to the structure storage-type location management table 706 (S802). Based on a result at S802, if it is determined that whole or part of the structure specified in the above query condition analyzed at S400 is stored on the main internal memory 117*a* ("Whole On Memory" or "Partial On Memory" at S802), all the processes from S402 to S406 will be executed.

Based on the result at S802, if it is determined that none of the structure specified in the above query condition analyzed at S400 is stored on the main internal memory 117*a* ("None On Memory" at S802), the process at S406 will be executed.

Next, the processes after S408 are repeatedly performed one by one for each document ID stored on the target document-on-disk management table 143 (S407).

Note that descriptions on the processes from S408 to S410 are omitted since the processes are the same as those of the first embodiment. After performing the processes from S408 to S410, the retrieval control program 122a activates the structured-data load program 704 so as to refer to the retrieval count-by-structure table 705 and load data of each target document from the magnetic disk device 102 into the partial document storage area 140 in the descending order from a structure having more retrieval counts to a structure having less retrieval counts, until the allocated capacity of the memory per document calculated at S301 is filled with the loaded data, and then the structure storage-type location management table 706 is updated (S803).

As described above, the processes are performed by the retrieval control program 122a.

Hereinafter, specific explanations will be given on how the document retrieval system 10 according to the second embodiment performs the document retrieval processes of FIG. 8, with reference to FIG. 9 (see FIGS. 7 and 8 if necessary).

Figure 9:
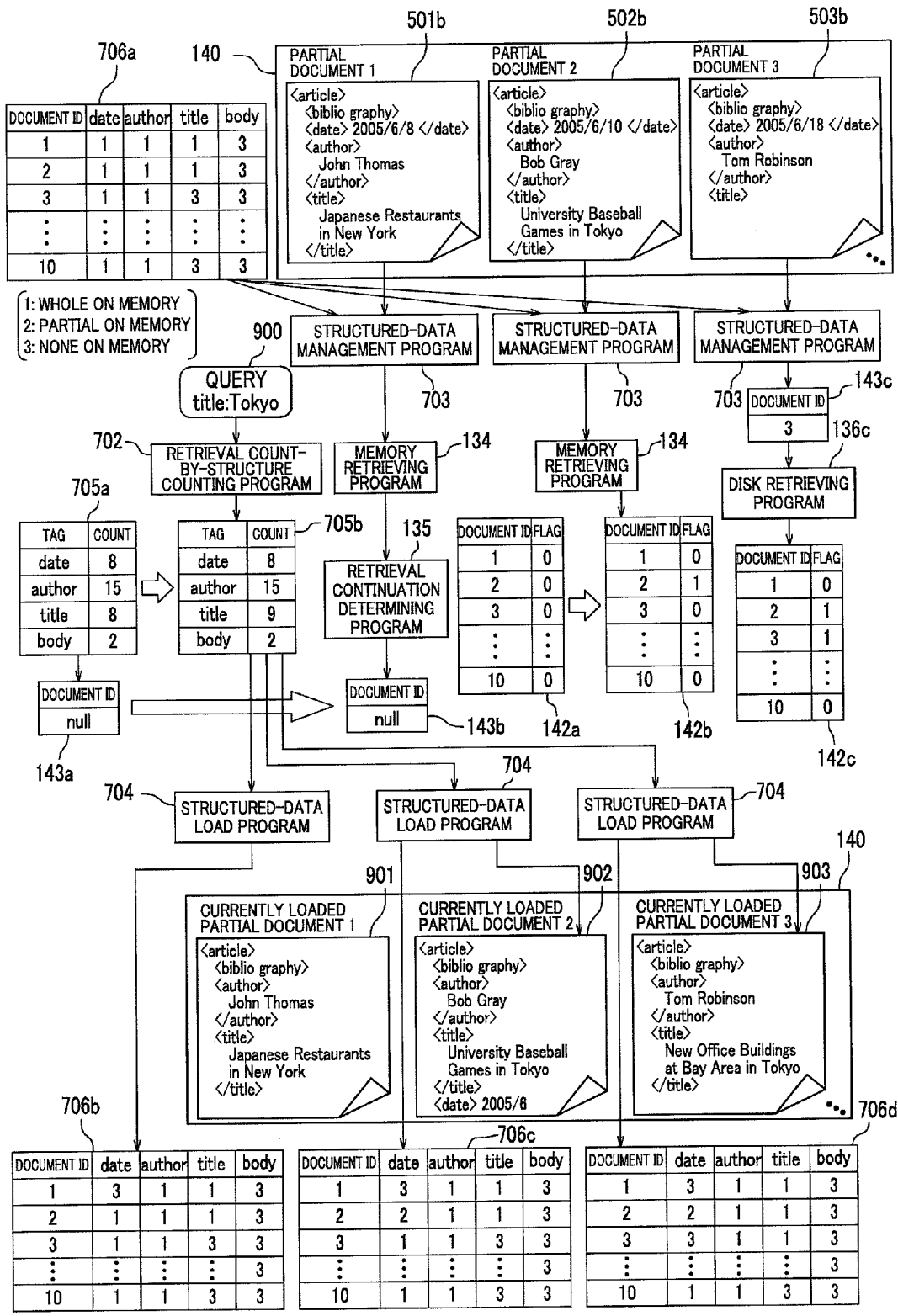
FIG. 9 shows how document retrieval processes according to the second embodiment are performed.

In FIG. 9, although it is supposed that the partial document storage area 140 stores ten partial documents, explanations will be given on the document retrieval processes according to the present embodiment by exemplifying only the partial document 1 (501b), the partial document 2 (502b) and the partial document 3, as a matter of convenience.

Figure 8:
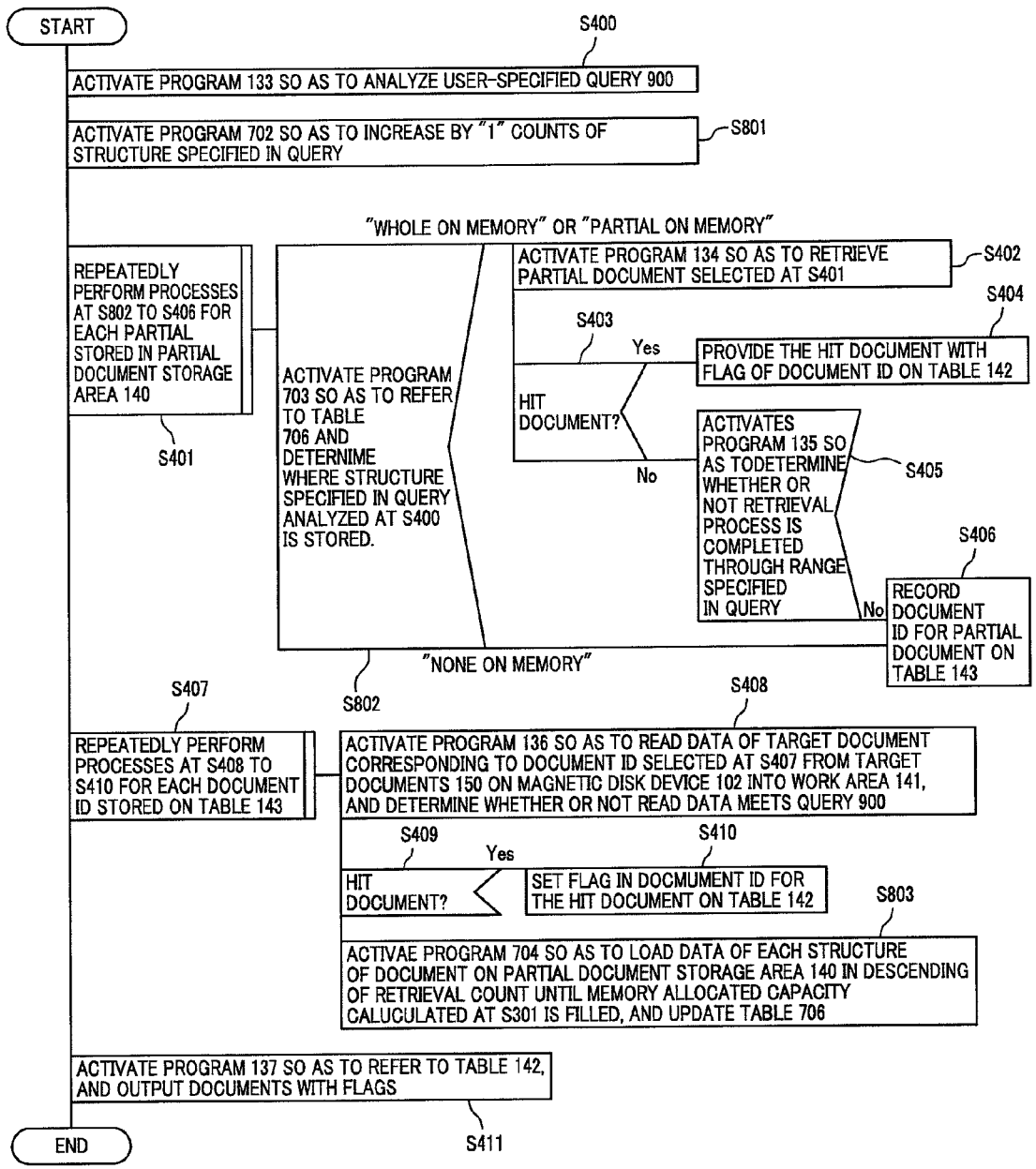
FIG. 8 is a PAD showing how processes are performed by a retrieval control program of the second embodiment.

First, the process at S801 in FIG. 8 is executed by activating the retrieval count-by-structure counting program 702 so as to increase by 1 a value in a tag field on the retrieval count-by-structure table 705, corresponding to the structure specified in the query.

In a more specific example as shown in FIG. 9, a query condition 900 is specified as "title: Tokyo", and 1 is added to a value in the tag field for the structure having a tag of "title" on the retrieval count-by-structure table 705, whereby the retrieval count-by-structure table 705 shifts a status thereof from 705a to 705b, in which the value in the tag field having a tag of "title" is increased from "8" to "9".

Next, the processes after S802 (S802 to S406) are repeatedly performed for each partial document stored in the partial document storage area 140.

The processes after S802 will be described as follows. First, the process at S802 of FIG. 8 is executed for the partial document 1 (501b), at which the structured-data management program 703 is activated so as to determine whether whole, part or none of the structure specified in the query condition 900 that has been analyzed at S400 of FIG. 8 is stored on the main internal memory 117a, by referring to the structure storage-type location management table 706.

In a more specific example as in shown in FIG. 9, the retrieval control program 122a refers to a status 706a of the structure storage-type location management table 706 and determines that the whole structure having a tag of "title" of the document 1 (501b) that has been specified in the query condition 900 is stored on the main internal memory 117a, so that the retrieval control program 122a activates the memory retrieving program 134 so as to execute the document retrieval process for the document 1 (501b).

Note that, in the second embodiment, values on the structure storage-type location management table 706 (706a, 706b and 706c) denote: "1: Whole On Memory", "2: Partial On Memory" and "3: None On Memory", respectively.

Next, the process at S403 of FIG. 8 is executed and it is determined whether the document 1 (501b) is a hit document or not.

The example of FIG. 9 show a status in which the document 1 (501b) is not the hit document regarding to the query 900 condition of "title: Tokyo", and the process at S405 is executed, at which the retrieval continuation determining program 135 is activated so as to determine whether or not the document retrieval processes are completed through the range specified in the query condition 900.

The example of FIG. 9 shows a status in which the document 1 (501b) is retrieved and it is determined that the retrieval processes are completed through the range of the query 900 of "title: Tokyo" and nothing is recorded on the target document-on-disk management table 143, as shown in a status 143b from 143a.

Next, the process at S802 is executed for the document 2 (502b), at which the structured-data management program 703 is activated so as to refer to the structure storage-type location management table 706 and determine whether whole, part or none of the structure specified in the query condition 900 that has been analyzed at S400 of FIG. 800 is stored on the main internal memory 117a.

The example of FIG. 9 shows a status in which it is determined, by referring to the status 706a of the structure storage-type location management table 706, that the whole structure having a tag of "title: Tokyo" specified in the query condition 900 is stored on the main internal memory 117a, so that the memory retrieving program 134 is activated so as to execute the document retrieval processes for the partial document 2 (502b).

Next, the process at S403 of FIG. 8 is executed so as to determine whether or not the partial document 2 (502b) is a hit document.

In a more specific example as shown in FIG. 9, since it is determined that the partial document 2 (502b) is a hit document for the query condition 900 of "title: Tokyo", the hit document management table 142 shifts a status thereof from 142a to 142b, in which the flag for the document ID="2" corresponding to the partial document 2 is updated from "0" to "1".

Then, the process at S802 is executed for the partial document 3 (503b), at which the structured-data management program 703 is activated so as to refer to the structure storage-type location management table 706 and determine whether whole, part or none of the structure specified in the query condition 900 that has been analyzed at S400 of FIG. 8 is stored on the main internal memory 117a.

In a more specific example as shown in FIG. 9, since it is determined that none of the structure having a tag of "title" specified in the query condition 900 for the partial document 3 (503b) is stored on the main internal memory 117a, so that the target document-on-disk management table 143c records "3" for the document ID of the document 3.

Next, the process at S407 of FIG. 8 is executed and processes after S408 is repeatedly performed for each document ID that is recorded on the target document-on-disk management table 143.

The processes after S407 are described as follows. First, the process at S408 of FIG. 8 is executed and the data-on-disk retrieving program 136 is activated so as to read a target document 150 corresponding to a selected document ID from the magnetic disk device 102 into the work area 141. Then, it is determined whether or not the read target document 150 meets the query condition 900 specified at S400 of FIG. 8, and determines whether or not the document is a hit document at S409 of FIG. 8.

In a more specific example as shown in FIG. 9, since the status 143c of the target document-on-disk management table 143 stores "3" for the document ID, document data corresponding to the document ID="3", that is, data of the target document 3 (503a), is read from the target documents 150 into the work area 141, so as to retrieve the document 3 (503a). Based on the retrieved result, it is determined that the document 3 (503a) is a hit document, so that the hit document management table 142 shifts a status thereof from 142b to 142c, in which the flag for the document ID="3" corresponding to the partial document 3 (503a) is updated from "0" to "1".

Then, the process at S803 is executed as follow.

First, the structured-data load program 704 is executed for the partial document 1 (501b). The structured-data load program 704 refers to the retrieval count-by-structure table 705, and loads data of each structure of the partial document 1 from the magnetic disk device 102 into the partial document storage area 140 until the allocated capacity of the memory of 150 bytes calculated at S301 is filled with the loaded data, one by one in the descending order from a structure having more retrieval counts to a structure having less retrieval counts. Then, the structure storage-type location management table 706 is updated. At this time, if whole data of the structure for the partial document 1 is loaded into the partial document storage area 140, the structure storage-type location management table 706 is updated by setting a value of "1" in the tag field of the document ID="1" corresponding to the partial document 1 ("Whole On Memory" of FIG. 9); if partial data of the structure for the partial document 1 is loaded into the partial document storage area 140, the table 706 is updated by setting a value of "2" in the tag field thereof ("Partial On Memory" of FIG. 9); and if no data of the structure for the partial document 1 is loaded into the partial document storage area 140, the table 706 is updated by setting a value of "3" in the tag field thereof ("None On Memory" of FIG. 9).

In a more specific example as shown in FIG. 9, as for the partial document 1 (501b), the structured-data load program 704 is activated so as to refer to the retrieval count-by-structure table 705, and then data of the structures for the partial document 1 is loaded from the magnetic disk device 102 into the partial document storage area 140 in the descending order of more-to-less retrieval counts, such as in the order of "author", "title", "date", "body" and so on. After the loaded data reaches the allocated capacity of the memory of 150 bytes calculated at S301 of FIG. 3, there is provided in the partial document storage area 140 a currently loaded partial document 1 (901 of FIG. 9), in which the order of the structures in the currently loaded partial document 1 has been changed depending on the retrieval frequencies thereof.

In the example of FIG. 9, the structure storage-type location management table 706 is updated to a status of 706b regarding each tag field for the document ID="1", in which the tag field of "date" includes a value of "3" (=none on memory), the tag field of "author" includes a value of "1" (=whole on memory), the tag field of "title" includes a value of "1" (=whole on memory), and the tag field of "body" includes a value of "3" (=none on memory) and so on.

Next, the structured-data load program 704 is executed for the partial document 2 (502b). The structured-data load program 704 refers to the retrieval count-by-structure table 705, and loads data of the structures of the partial document 2 from the magnetic disk device 102 into the partial document storage area 140 until the allocated capacity of the memory of 150 bytes calculated at S301 is filled with the loaded data, one by one in the descending order of more-to-less retrieval counts. Then, the structure storage-type location management table 706 is updated.

In a more specific example as shown in FIG. 9, as for the partial document 2 (502b), the structured-data load program 704 is activated so as to refer to the retrieval count-by-structure table 705, and then data of the structures for the partial document 2 is loaded from the magnetic disk device 102 into the partial document storage area 140 in the descending order of more-to-less retrieval counts, such as in the order of "author", "title", "date", "body" and so on. After the loaded data reaches the allocated capacity of the memory of 150 bytes calculated at S301 of FIG. 3, there is provided in the partial document storage area 140 a currently loaded partial document 2 (902 of FIG. 9), in which the order of the structures has been changed depending on the retrieval frequencies thereof.

In the example of FIG. 9, the structure storage-type location management table 706 is updated to a status of 706c regarding each tag field for the document ID="2", in which the tag field of "date" includes a value of "2" (none on memory), the tag field of "author" includes a value of "1" (whole on memory), the tag field of "title" includes a value of "1" (whole on memory), and the tag field of "body" includes a value of "3" (none on memory) and so on.

Next, the structured-data load program 704 is executed for the partial document 3 (503b). The structured-data load program 704 refers to the retrieval count-by-structure table 705, and loads data of the structure of the partial document 3 from the magnetic disk device 102 into the partial document storage area 140 until the allocated capacity of the memory of 150 bytes calculated at S301 is filled with the loaded data, one by one in the descending order of more-to-less retrieval counts. Then, the structure storage-type location management table 706 is updated.

In a more specific example as shown in FIG. 9, as for the partial document 3 (503b), the structured-data load program 704 is activated so as to refer to the retrieval count-by-structure table 705, and then data of the structures for the partial document 3 is loaded from the magnetic disk device 102 into the partial document storage area 140 in the descending order of more-to-less retrieval counts, such as in the order of "author", "title", "date", "body" and so on. After the loaded data reaches the allocated capacity of the memory of 150 bytes calculated at S301 of FIG. 3, there is provided in the partial document storage area 140 a currently loaded partial document 3 (903 of FIG. 9), in which the order of the structures has been changed depending on the retrieval frequencies thereof.

In the example of FIG. 9, the structure storage-type location management table 706 is updated to a status of 706d regarding each tag field for the document ID="3", in which the tag field of "date" includes a value of "3" (none on memory), the tag filed of "author" includes a value of "1" (whole on memory), the tag filed of "title" includes a value of "1" (whole on memory), and the tag filed of "body" includes a value of "3" (none on memory) and so on.

Note that the data loading operation executed by the structured-data load program 704 with reference to the retrieval count-by-structure table 705 as mentioned above may not be performed every time the structured-data load program 704 activates, and the loading operation may be set at appropriate frequencies in accordance with necessity.

As described above, the explanations have been given on the second embodiment of the present invention.

According to the second embodiment of the present invention, as shown in FIG. 9, the order of the structures of the document is changed depending on the retrieval frequencies of the structures, by referring to the retrieval count-by-structure table 705. It may also be applicable that a user defines which structure should be stored in the partial document storage area 140 or which structure should be excluded therefrom, by using a GUI (Graphical User Interface) in FIG. 8.

Figure 18:
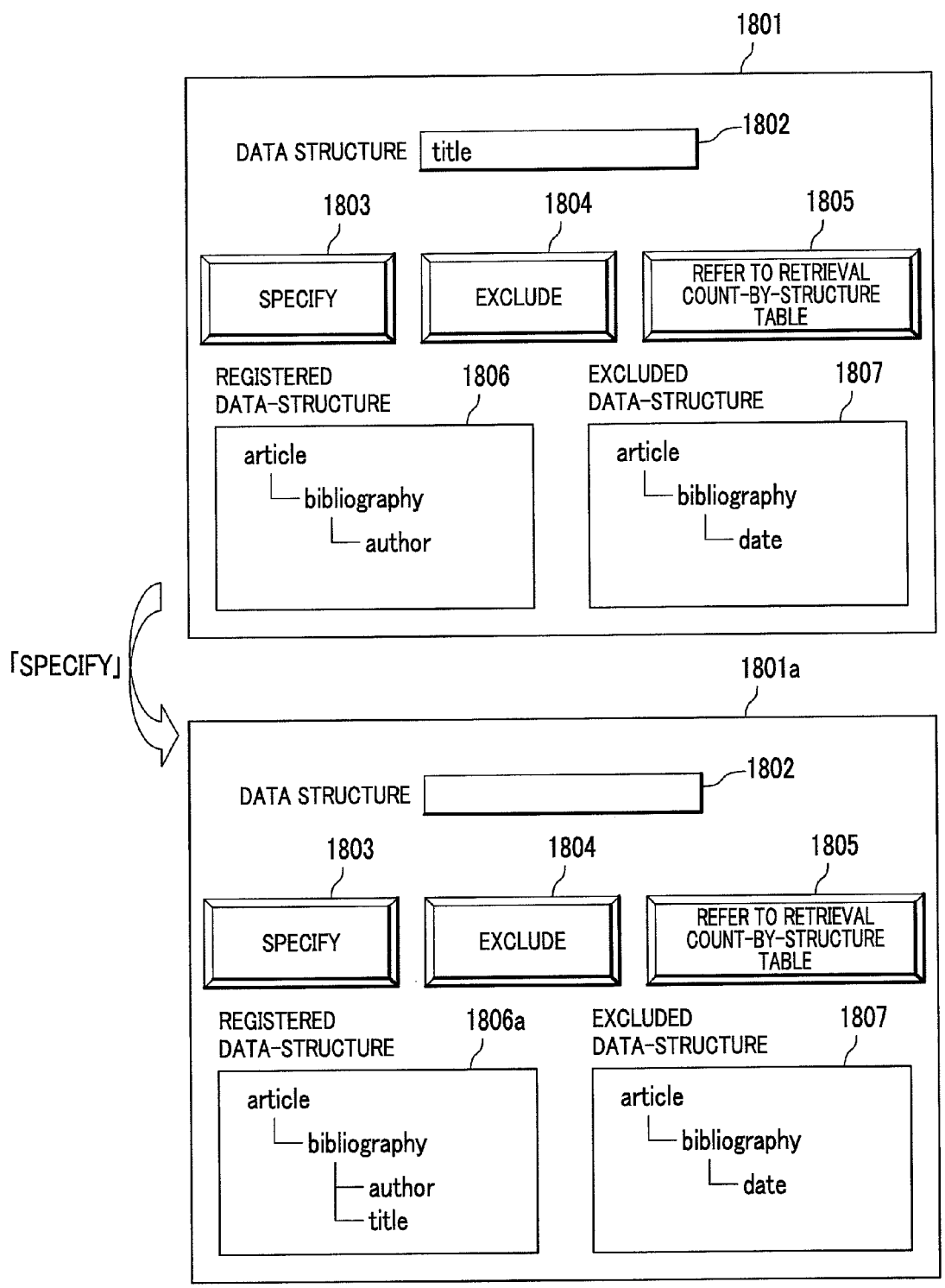
FIG. 18 shows a GUI according to the second embodiment.

Specifically, the GUI 1801 as shown in FIG. 18 includes a "data-structure" definition field 1802, a "specify" button 1803, a "exclude" button 1804, a "refer to retrieval count-by-structure table" button 1805, a "registered data-structure" display 1806 and an "excluded data-structure" display 1807.

As shown in the GUI 1801 of FIG. 18, "title" is inputted in the "data-structure" definition field 1802, the "registered data-structure" display 1806 displays that "author" is already registered. This means that "author" set as a registered data-structure is specified as a data structure to be stored in the partial document storage area 140. The "excluded data-structure" display 1807 displays that "date" is already registered. This means that "date" set as an excluded data-structure is specified as a structure to be excluded from the partial document storage area 140.

In the status as shown in FIG. 8, if the "specify" button 1803 is clicked, "title" is added in a "registered data-structure" display 1806a as shown in a GUI 1801a below, so that "title" is specified by the user as a data structure to be stored in the partial document storage area 140. Alternatively, if not the "specify" button 1803 but the "exclude" button is clicked (not shown) in FIG. 18, then "title" is added in the "excluded data-structure" display 1807, so that the "title" is to be excluded from the partial document storage area 140. Furthermore, if the "refer to retrieval count-by-structure table" button 1805 is clicked, the user can refer to the retrieval count-by-structure table 705.

As explained above, the document retrieval system according to the second embodiment of the present invention calculates retrieval counts for each structure, based on which structures having higher retrieval frequencies are preferentially stored on the main internal memory 117a, thereby realizing a high speed document retrieving performance regarding the structure. Priority of structure is defined not only by the retrieval frequency, but may also be defined by the user. Structures to be preferentially stored on the main internal memory 117a may be defined by the attribute or the type based on the structure name, or by the length of characters included in the structure. Accordingly, it is possible to optimize a query condition regarding the structure of the document in accordance with the user's preference, thereby realizing a high speed document retrieval system.

Third Embodiment

Figure 10:
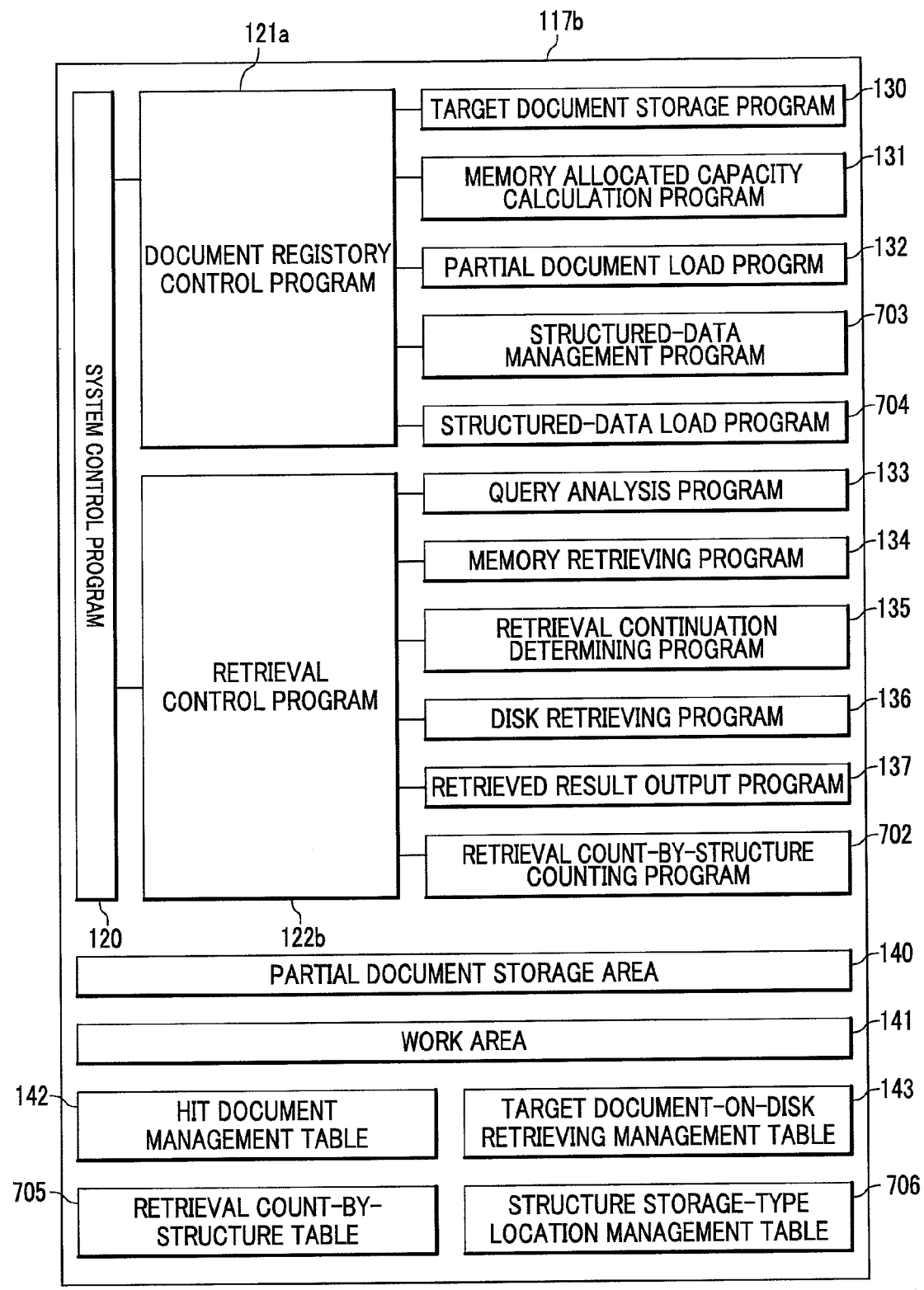
FIG. 10 is a block diagram showing a configuration of a main internal memory of a document retrieval system according to the third embodiment.

Hereinafter, explanations will be provided on the third embodiment of the present invention, with reference to FIG. 10.

In the second embodiment, the explanations will be provided by using the identical references for components or processes having the identical functions as those of the first and second embodiments, and by using the similar references for components or processes having the similar functions as those of the first and second embodiments.

In the first and second embodiments, it may be supposed that the main internal memory already stores the partial documents and is occupied with those partial documents. In such a state, if a target document is further registered, the main internal memory cannot store a partial document of the currently registered target document any more. Consequently, this may case deterioration in retrieval speed performance of the system when the partial document of the currently registered target document is retrieved if containing a query condition.

To counter this problem, the document retrieval system 10 according to the third embodiment, if a target document is further registered even in a state in which the main internal memory can provide no allocated capacity for the currently registered document, recalculates an allocated capacity of the memory per target document including the currently registered document, by which the data of each target document is reloaded on the main internal memory, as a partial document thereof. Accordingly, a high speed document retrieving operation can be provided for those target documents as well as the currently registered target document.

The third embodiment employs a main internal memory 117b (FIG. 10) which has an approximately the same configuration as the main internal memory 117a (FIG. 7) of the second embodiment except for a configuration of a document registry control program 121a including a structured-data management program 703 and a structured-data load program 704 as well as a target document storage program 130, a memory allocated capacity calculation program 131 and a partial document load program 132. A retrieval control program 122b of the main internal memory 117b employs approximately the same configuration as the retrieval control program 122 of the main internal memory 117 of the first embodiment, except for including the retrieval count-by-structure counting program 702. The third embodiment also employs the same management tables as those of the second embodiment, which are a retrieval count-by-structure table 705 and a structure storage-type location management table 706 as well as a hit document management table 142 and a target document-on-disk management table 143. Other components of the third embodiment are the same as those of the first embodiment.

Figure 11:
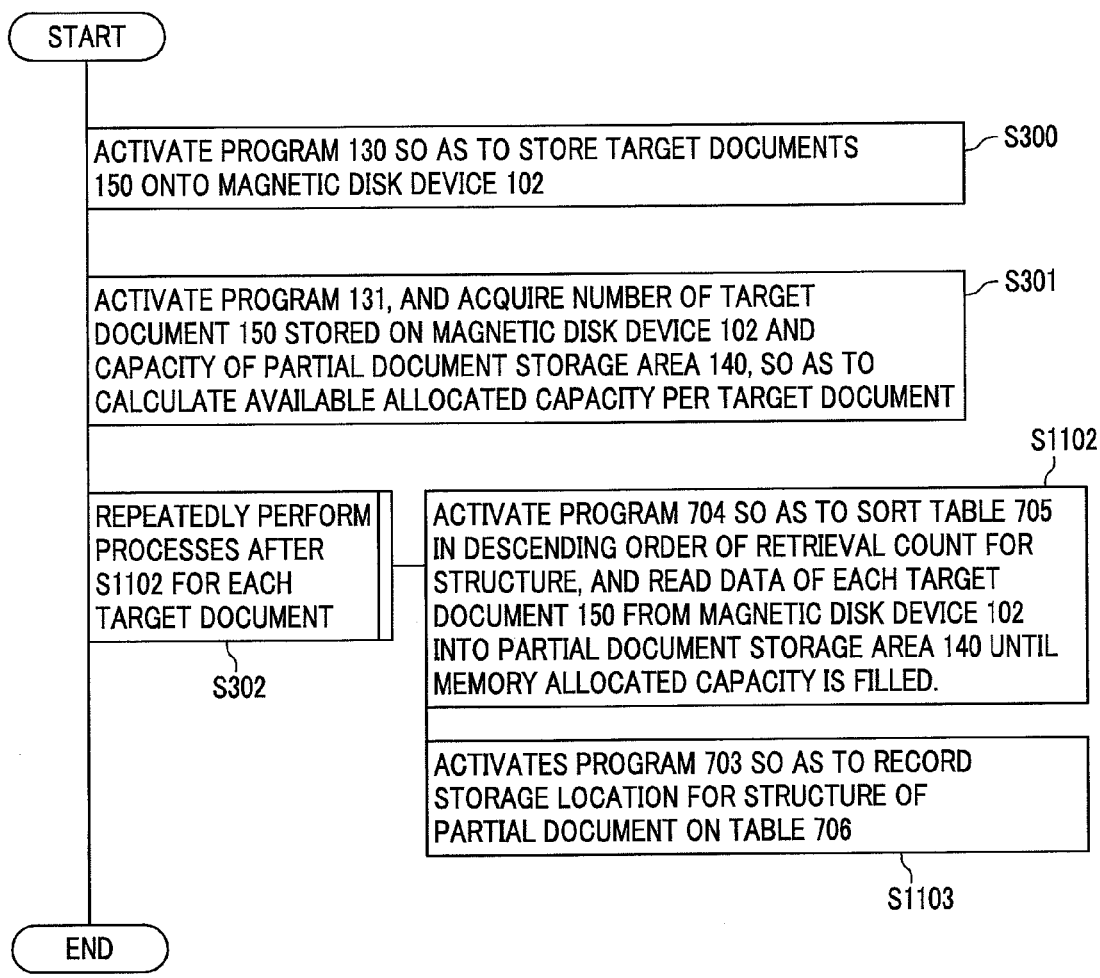
FIG. 11 is a PAD showing how processes are performed by a retrieval control program of the third embodiment.

Of all processes according to the third embodiment, explanations will be give on processes executed by the document registry control program 121a, which are different from those of the first embodiment, with reference to PAD (Problem Analysis Diagram) of FIG. 11 (see FIG. 1 if necessary). Note that the processes by the document registry control program 121a of FIG. 11 employ S1102 and S1103 instead of S303 of FIG. 3. Explanations will be given on the processes at S1102 and S1103, as follows.

The document registry control program 121a activates the structured-data load program 704 so as to sort the retrieval count-by-structure table 705 in the order of more-to-less retrieval counts for structure. Note that the methods of how to count and record retrieval counts for structure by using the retrieval count-by-structure table 705 in the present embodiment are the same as those of the second embodiment; therefore, explanations on the methods will be omitted. Data of each target document is read as a partial document in the descending order of more-to-less retrieval counts for structure from a magnetic disk device 102 into a partial document storage area 140 until an allocated capacity of the memory for each target document recalculated at S301 is filled with read data as the partial document (S1102).

Then, the document registry control program 121a activates the structured-data management program 703 so as to record a storage location for every structure of each partial document on the structure storage-type location management table 706 (S1103).

As described above, the processes are performed by the document registry control program 121a.

Hereinafter, specific explanations will be given on how the document retrieval system 10 according to the third embodiment of the invention performs document registry processes (FIG. 11), with reference to FIG. 12 (see FIGS. 10 and 11 if necessary).

In the first and second embodiments, ten target documents are already stored on the magnetic disk device 102 as shown in FIG. 5. In the third embodiment, as shown in FIG. 12, it is supposed that another target document is further registered to the ten target documents of FIG. 5, so that the magnetic disk device 102 stores 11 target documents including the currently registered target document (i.e. a target document 1 (1201) to a partial document 11 (1211)).

First, the process at S301 of FIG. 3 is executed by activating the memory capacity calculation program 131 so as to recalculate an allocated capacity of the memory for each target document including the currently registered target document based on the number of the target documents stored on the magnetic disk device 102 and a capacity of the partial document storage area 140.

Figure 12:
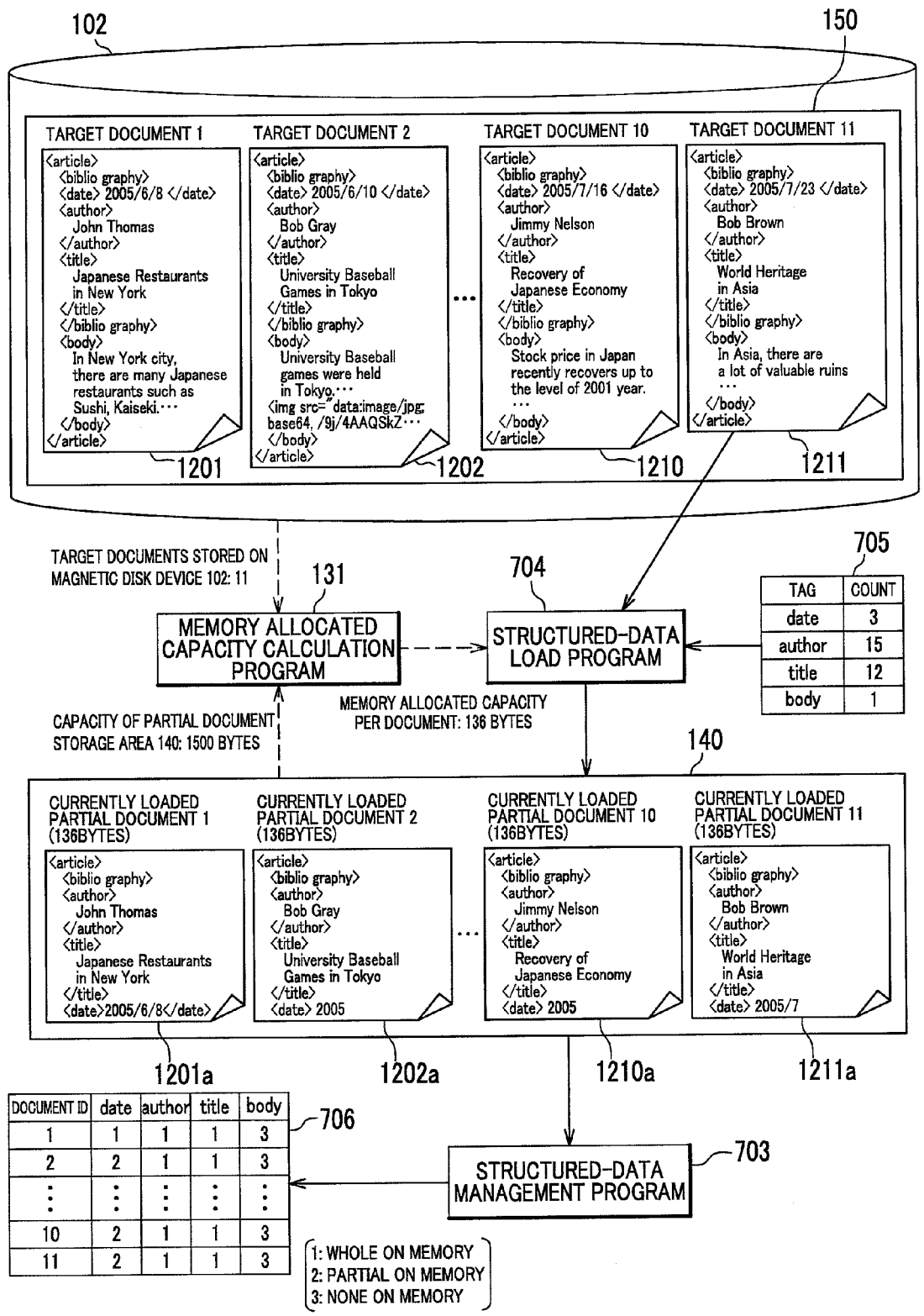
FIG. 12 shows how document registry processes according to the third embodiment are performed.

In a specific example of FIG. 12, the capacity of the partial document storage area 140 (="1500 bytes") divided by the number of the target documents stored on the magnetic disk device 102 (="11") yields an allocated capacity of the memory for each target document (1500 bytes/11=136 bytes).

Processes after S1102 of FIG. 11 are repeatedly performed for each target document stored on the magnetic disk device 102 (S302).

Specific descriptions will be given on how to perform the processes after S1102 as follow. First, the process at S1102 is executed by the structured-data load program 704 so as to refer to the retrieval count-by-structure table 705, and reload structures of each target document in the descending order of more-to-less retrieval counts from the magnetic disk device 102 into the partial document storage area 140 until the allocated capacity of the memory calculated at S301 is filled with the reloaded data. Next, the process at S1103 is executed by the structured-data management program 703 so as to record a storage location for every structure of each partial document.

In a specific example of FIG. 12, the structured-data load program 704 reads each target document 150 (i.e. target documents 1 to 11) and changes the order of structures in the target document in the order of "author", "title", "date" and "body", with reference to the retrieval count-by-structure table 705, and loads head 136 byte data of each read target document as a partial document thereof into the partial document storage area 140 (more precisely, "reloads" could be used for the target documents 1 to 10).

Note that the data loading operation executed by the structured-data load program 704 with reference to the retrieval count-by-structure table 705 as mentioned above may not be performed every time the structured-data load program 704 activates, and the loading operation may be set at appropriate frequencies in accordance with necessity.

As for the target document 1 (1201), 136 byte data for the target document 1 includes structures having a tag of "author", "title" and "date" respectively, which make up of the partial document 1 (1201a). The structured-data management program 703 stores in the partial document storage area 140 the structures for the partial document 1 (1201a) from "author", "title" up to "date". Therefore, the structure storage-type location management table 706 includes the document ID="1", in which "author" and "title" are provided with a value of "1", and "body" is provided with a value of "3" since the structure having a tag of "body" is not stored in the partial document storage area 140.

As for the target document 2, head 136 byte data for the target document 2 includes structures having a tag of "author", "title" and some data of a structure having a tag of "date", respectively, which make up of a partial document 2 (1202a) and are stored in the partial document storage area 140. The structured-data management program 703 stores in the partial document storage area 140 the structures for the partial document 2 (1202a) from "author", "title" up to some data of "date". Therefore, the structure storage-type location management table 706 includes the document ID="2", in which "author" and "title" are provided with a value of "1", and "date" is provided with a value of "2" because some data of "date" is stored in the partial document storage area 140. The structure having a tag of "body" is provided with a value of "3" because it is not stored in the partial document storage area 140.

As for the target document 10 (1210), head 136 byte data for the target document 10 includes structures having a tag of "author", "title" and some data of a structure having a tag of "date" respectively, which make up of a partial document 10 (1210a) and are stored in the partial document storage area 140. The structured-data management program 703 stores in the partial document storage area 140 the structures for the partial document 10 (1210a) from "author", "title" up to some data of "date". Therefore, the structure storage-type location management table 706 includes the document ID="10", in which "author" and "title" are provided with a value of "1", and "date" is provided with a value of "2" because some data of "date" is stored in the partial document storage area 140. The structure having a tag of "body" is provided with a value of "3" because it is not stored in the partial document storage area 140.

As for the target document 11 (1211), head 136 byte data for the target document 11 includes structures having a tag of "author", "title" and some data of a structure having a tag of "date", respectively, which make up of a partial document 11 (1211a) and are stored in the partial document storage area 140. The structured-data management program 703 stores in the partial document storage area 140 the structures for the partial document 11 (1211a) from "author", "title" up to some data of "date". Therefore, the structure storage-type location management table 706 includes the document ID="11", in which "author" and "title" are provided with a value of "1", and "date" is provided with a value of "2" because some data of "date" is stored in the partial document storage area 140. The structure having a tag of "body" is provided with a value of "3" because it is not stored in the partial document storage area 140.

As described above, the explanations have been given on the first embodiment of the present invention.

As explained above, according to the third embodiment of the present invention, even if a target document is additionally registered after the capacity of the main internal memory is filled with data of partial documents already stored thereon, the document retrieval system recalculates an allocated capacity of the memory for each document, and reload structures of each target document into the partial document storage area 140 until the recalculated allocated capacity of the memory is filled with the reloaded data. Accordingly, the document retrieval system of the third embodiment of the present invention can realize a high speed retrieval performance for target documents including the currently registered target document.

Recalculation of an allocated capacity of the memory per document and reload of partial data of each target document based on the recalculated allocated capacity of the memory may be applicable to a case without changing the order of structures of the document in the descending order of more-to-less retrieval counts.

According to the present invention, it may also be possible to increase an allocated capacity of the memory per document when the partial document storage area 140 acquires more capacity, by performing the processes from S301 to S1103 of FIG. 11. Accordingly, the document retrieval system of the present invention enhances probabilities of completing the document retrieving operation only by retrieving the partial documents, resulting in enhancing efficiencies of retrieving documents. In addition, even in a case in which the available capacity of the main internal memory, which is the partial document storage area 140, is decreased, it may be possible to store all the partial documents of the target documents on the memory by repeatedly performing the processes at S301 and S302 of FIG. 11, thereby realizing a document retrieving operation with making the most of the available capacity of the main internal memory.

Fourth Embodiment

Hereinafter, explanations will be given on a fourth embodiment of the present invention, with reference to FIG. 13.

In the second embodiment, it likely happens that, if a particular structure more frequently retrieved in a target document has an extremely large size, an allocated capacity of the memory for each target document of the partial document storage area 140 cannot accept the whole structure. This may likely cause such a problem that the magnetic disk device 102 is retrieved more frequently, resulting in deterioration in speed performance of the document retrieval system.

A document retrieval system according to the fourth embodiment puts a focus on usable documents for the user, and stores the whole structure that is more frequently retrieved in the usable document onto the main internal memory, so as to realize a high speed performance of the document retrieval system.

A main internal memory 117c according to the fourth embodiment has an approximately same configuration the main internal memory 117a of the second embodiment (FIG. 7), except for the following components of a system control program 120a of the main internal memory 117c.

The system control program 120a of the present embodiment includes a retrieval control program 122c that further includes a hit count-by-document counting program 1301 in addition to those components of the retrieval control program 122a of FIG. 7. The system control program 120a of the present embodiment includes a partial document optimizing control program 123 including a hit count-by-document table sort program 1302, a structure storage determining program 1303, the structured-data management program 703 and the structured-data load program 704.

Figure 13:
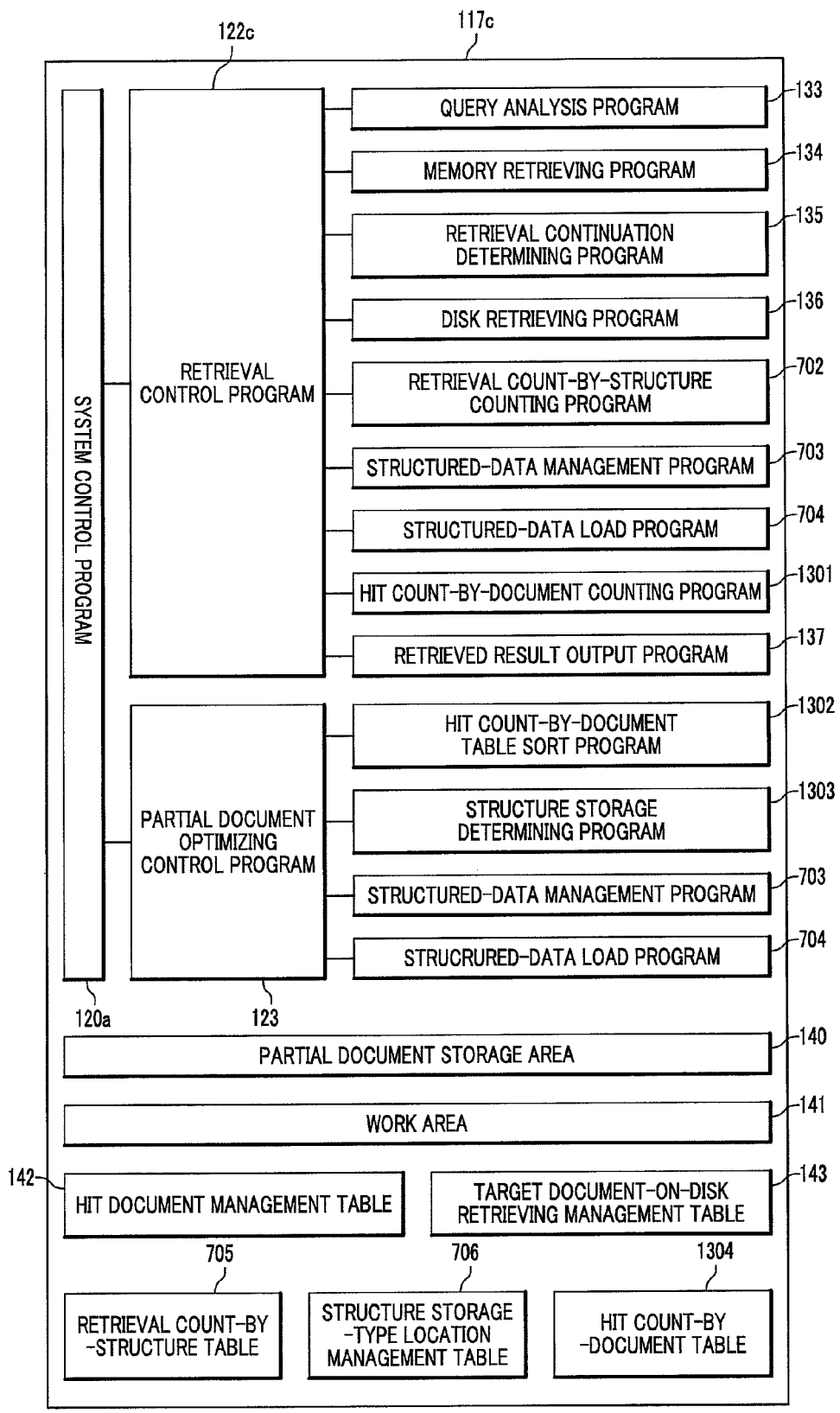
FIG. 13 is a block diagram showing a configuration of a main internal memory of a document retrieval system according to the fourth embodiment.

As for various data management tables, the internal main memory 117c of FIG. 13 of the present embodiment further includes a hit count-by-document table 1304 in addition to a hit document management table 142, a target document-on-disk management table 143, a retrieval count-by-structure table 705 and a structure storage-type location management table 706.

Figure 14:
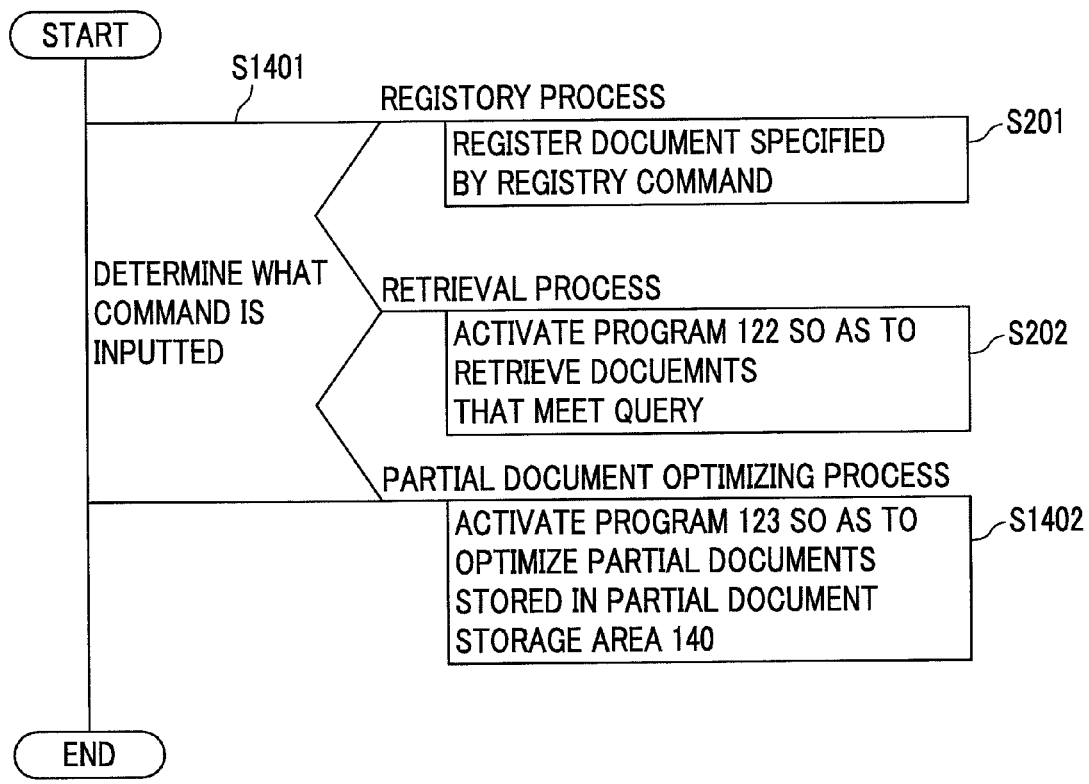
FIG. 14 is a PAD showing how processes are performed by a system control program of the fourth embodiment.

Hereinafter, of all processes according to the fourth embodiment, processes executed by the system control program 120a, which are different from those of the second embodiment, will be explained with reference to a PAD of FIG. 14 (see FIG. 13 if necessary). Note that the processes of FIG. 14 include a process at S1401 (corresponding to S200 of FIG. 2) and a process at S1402 for a partial document optimizing process, which are different from the processes of FIG. 2 of the second embodiment.

The system control program 120a analyzes what command is inputted from the keyboard 111 (S1401). Based on the analyzed result, if it is determined that the inputted command is for executing the partial document optimizing process ("partial document optimizing process" at S1401), the system control program 120a activates the partial document optimizing control program 123 so as to optimize partial documents stored in the partial document storage area 140 (S1402).

As described above, the processes are executed by the system control program 120a, which is different from the system control program 120 of the second embodiment.

Figure 15:
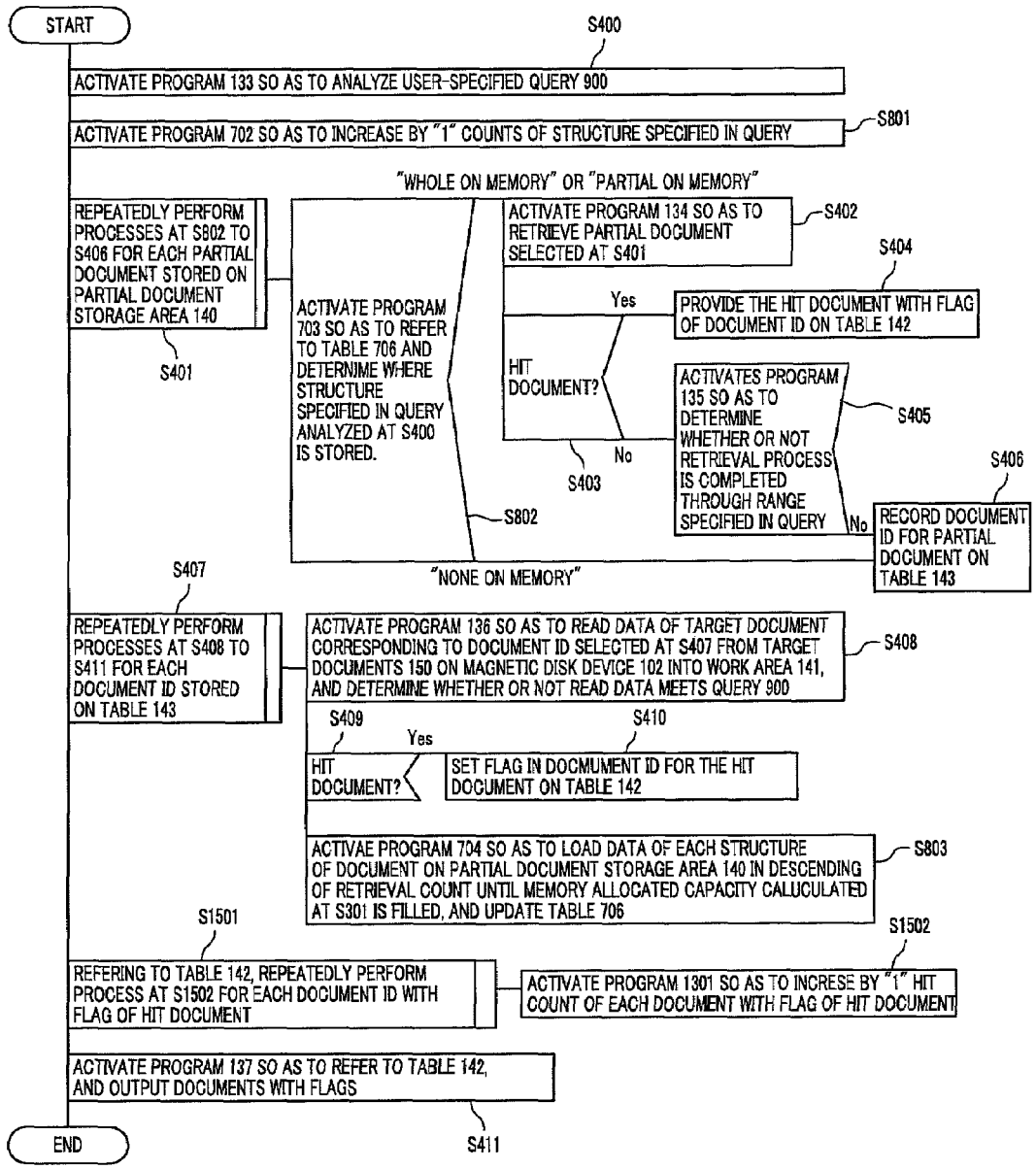
FIG. 15 is a PAD showing how processes are performed by a retrieval control program of the fourth embodiment.

The processes executed by the retrieval control program 122c different from the retrieval control program 122a of the second embodiment will be described, with reference to a PAD of FIG. 15, as follow (see FIG. 13 if necessary). In the processes of FIG. 15, the present embodiment further employs the processes at S1501 and S1502 prior to S411 of FIG. 8 of the second embodiment.

Explanations will be given on the processes at S1501 and S1502 which are different from FIG. 8.

With reference to hit document management table 142, the process at S1502 is repeatedly executed for each document ID provided with a flag indicating a hit document.

The retrieval control program 122c activates the hit count-by-document counting program 1301 so as to increase by "1" the hit counts for each document carrying a hit-document flag (S1502).

As described above, the processes are executed by the retrieval control program 122c.

The processes executed by the partial document optimizing control program 123 will be explained with reference to the PAD of FIG. 16 (see FIG. 13 if necessary).

The partial document optimizing control program 123 activates the hit count-by-document table sort program 1302 so as to sort the hit count-by-document table 1304 in the descending order from more to less hit counts (S1601).

Next, the partial document optimizing control program 123 acquires a capacity of the partial document storage area 140, and sets the capacity as an initial value of remaining capacity thereof (S1602).

Then, referring to the hit count-by-document table 1304 that has been sorted at S1601, the partial document optimizing control program 123 selects a document ID one by one, and repeatedly executes the processes after S1604 for each selected document ID (S1603).

In the processes after S1604, first, a size of the structure specified in the command (specified in the user's query) is calculated for each selected document ID (S1604) from the hit count-by-document table 1304. The retrieval control program 122c activates the structure storage determining program 1303 so as to determine whether or not the remaining capacity of the partial document storage area 140 is equal to or more than the size of the specified structure (calculated at S1604) for each selected document ID (S1605).

Based on the result at S1605, if it is determined that the remaining capacity of the partial document storage area 140 is equal to or more than the size of the specified data structure calculated at S1602 (Yes at S1605), a following process will be executed; the partial document optimizing control program 123 activates the structured-data load program 704 so as to load the structure of each selected document ID, which is specified in the command, as a partial document into the partial document storage area 140 (S1606). Next, the partial document optimizing control program 123 activates the structured-data management program 703 so as to update the structure storage-type location management table 706 (S1607). Then, the size of the specified structure for the selected document ID calculated at 1604 is subtracted from the remaining capacity of the partial document storage area 140, and a resulted value is set as a current remaining capacity of the partial document storage area 140 (S1608).

Based on the result obtained at S1605, if it is determined that the current remaining capacity of the partial document storage area 140 is less than the size of the structure calculated at S1602 (No at S1605), the following process will be performed; the structured-data load program 704 is activated so as to load a structure by the remaining capacity of the partial document storage area 140 so that the area 140 is filled up with the loaded data. Accordingly, the partial document optimizing process is completed (S1610).

As described above, the processes are executed by the partial document optimizing control program 123.

Figure 16:
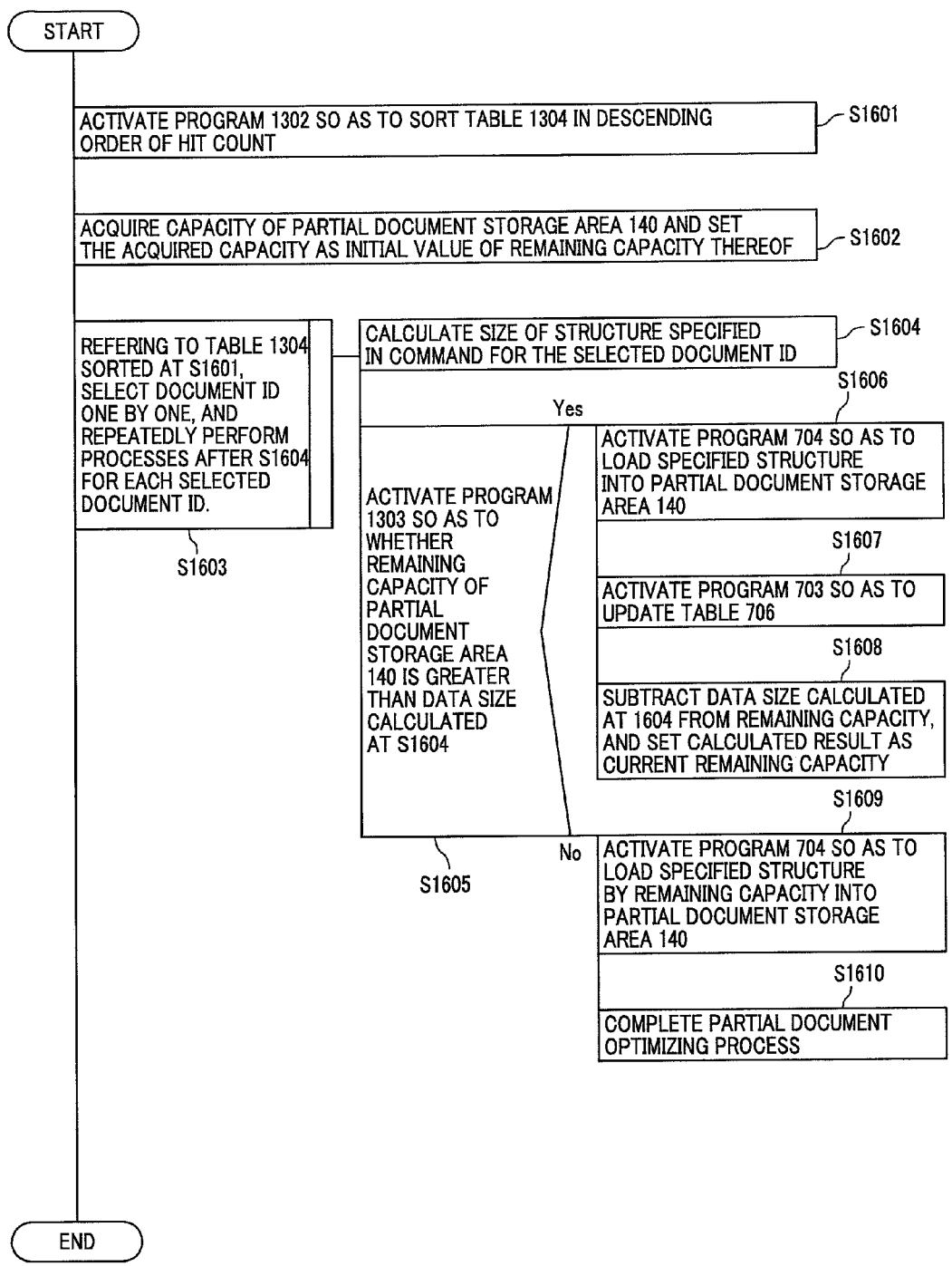
FIG. 16 is a PAD showing how processes are performed by a partial document optimizing control program of the fourth embodiment.

Hereinafter, specific explanations will be given on how to perform the partial document optimizing process according to the fourth embodiment as shown in FIG. 16, with reference to FIG. 17 (see FIG. 13 and FIG. 16 if necessary).

First, the process at S1601 of FIG. 16 is executed, at which the hit count-by-document table sort program 1302 is executed so as to sort the document IDs on the sort the hit count-by-document table 1304 in the descending order from more to less hit counts.

Figure 17:
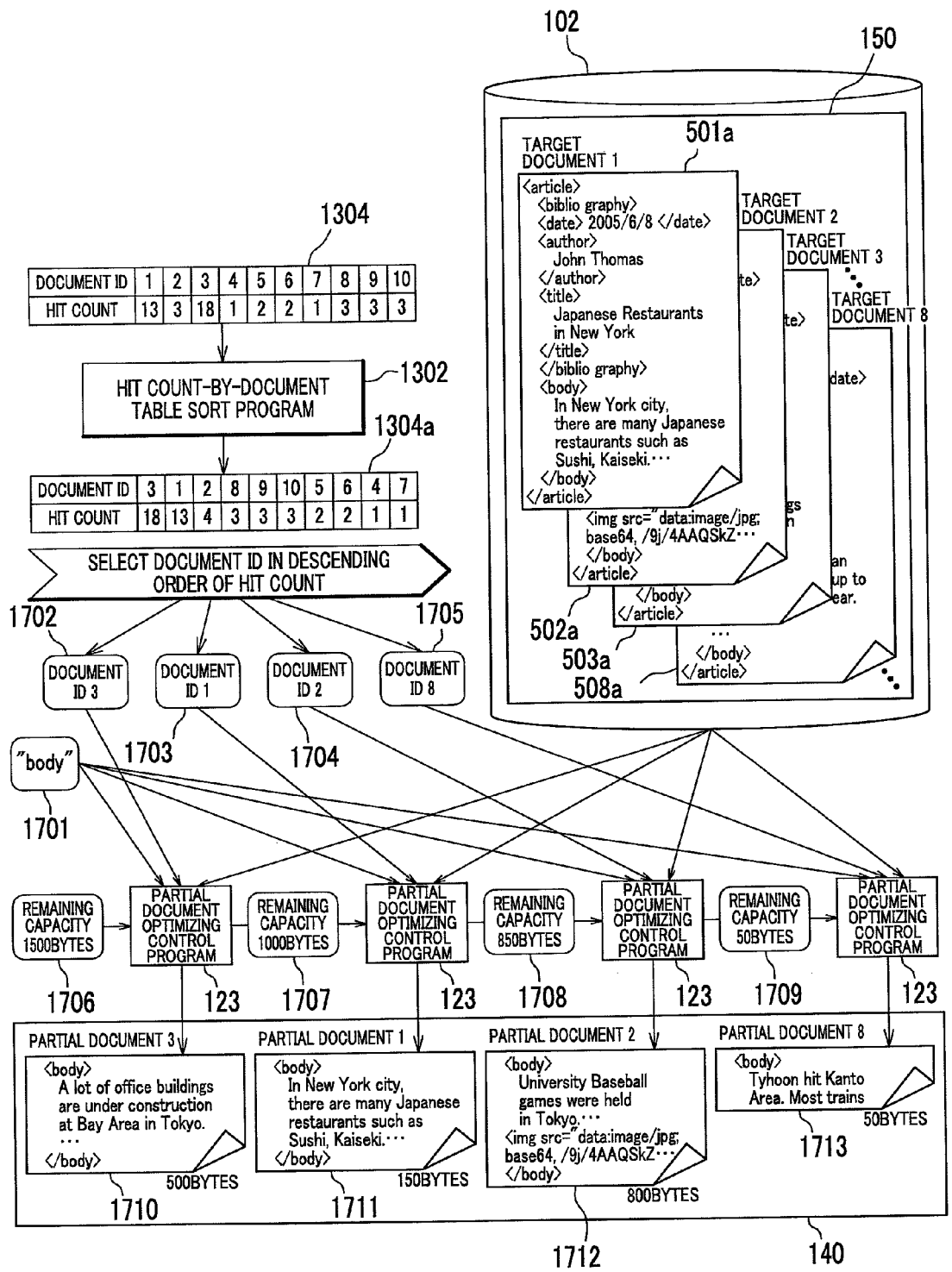

As shown in FIG. 17, the document IDs on the hit count-by-document table 1304 is sorted and the hit count-by-document table 1304 shifts a status thereof to 1304a.

Next, the partial document optimizing control program 123 acquires the capacity of the partial document storage area 140 and sets the capacity as an initial value of the remaining capacity thereof.

In FIG. 17, 1500 bytes are set as the initial vale of the remaining capacity 1706 of the partial document storage area 140.

Next, the partial document optimizing control program 123 refers to the hit count-by-document table 1304a sorted at S1601, and repeatedly performs the processes after S1604 for each document ID.

The processes after S1604 will be described; first, the partial document optimizing control program 123 refers to the hit count-by-document table program 1304a so as to select each document ID one by one in the descending order of hit count, and calculates the size of the specified structure for the selected document. Then, it is determined whether or not the remaining capacity of the partial document storage area 140 is equal to or more than the calculated structure size.

In a specific example of FIG. 17, the document ID="3" (1702) is selected from the hit count-by-document table program 1304a, and the size of the structure is calculated as 500 bytes regarding "body" (1701) which is a structure specified in the command (in the user's query). Since it is determined that the initial value of 1500 bytes for the remaining capacity 1706 of the partial document storage area 140 is more than the size of the structure of 500 bytes, the partial document optimizing control program 123 activates the structured-data load program 704, and then the structure having a tag of "body" of the document ID="3" is loaded in the partial document storage area 140 as a partial document 3 (1710). At the same time, FIG. 17 shows that the remaining capacity of the partial document storage area 140 shifts a status thereof from 1706 (1500 bytes) to 1707 (1500 bytes−500 bytes=1000 bytes).

Next, the partial document optimizing control program 123 selects the document ID="1" from the hit count-by-document table program 1304a, and calculates the size of the structure having a tag of "body" (1701) specified in the command as 150 bytes for the document ID="1". Since it is determined that the remaining capacity 1707 (1000 bytes) of the partial document storage area 140 is equal to or more than the size of the specified structure of 150 bytes, the partial document optimizing control program 123 loads the structure having a tag of "body" for the document ID="1" in the partial document storage area 140 as a partial document 1 (1711). At the same time, the remaining capacity of the partial document storage area 140 (1000 bytes) shifts a status thereof from 1707 (1000 bytes) to 1708 (1000 bytes−150 bytes=850 bytes).

Next, the partial document optimizing control program 123 selects the document ID="2" from the hit count-by-document table program 1304a, and calculates the size of the structure having a tag of "body" specified in the command (1701) as 800 bytes. Since the remaining capacity 1708 (850 bytes) of the partial document storage area 140 is greater than 800 bytes of the specified structure, the partial document optimizing control program 123 loads the structure having a tag of "body" for the document ID="2" in the partial document storage area 140 as a partial document 2 (1712). At the same time, FIG. 17 shows that the remaining capacity 1708 of the partial document storage area 140 shifts a status thereof from 1706 (850 bytes) to 1707 (850 bytes−800 bytes=50 bytes).

Next, the partial document optimizing control program 123 selects the document ID="8" from the hit count-by-document table program 1304a, and calculates the size of the structure having a tag of "body" (1701) specified in the command as 300 bytes. The remaining capacity 1709 (50 bytes) of the partial document storage area 140 is not greater than the specified data size of (300 bytes) for the document ID="8" (1705) Therefore, the partial document optimizing control program 123 loads the structure having a tag of "title" for the document ID="8" by the remaining capacity 1709 (50 bytes) as a partial document in the partial document storage area 140.

According to the present embodiment, as explained in FIG. 17, the structure of the document is specified depending on the command (query) specified by the user. However, it may be possible for the user directly to specify which structures are to be stored in the partial document storage area 140 or to be excluded therefrom, by using a GUI 1901 of FIG. 19. The GUI 1901 of FIG. 19 may include a document at higher priorities storage check box 1902 for specifying documents at higher priorities to be preferentially stored into the partial document storage area 140.

Other components of the GUI 1901 are configured in the same manner as the GUI 1801 of FIG. 18.

Figure 19:
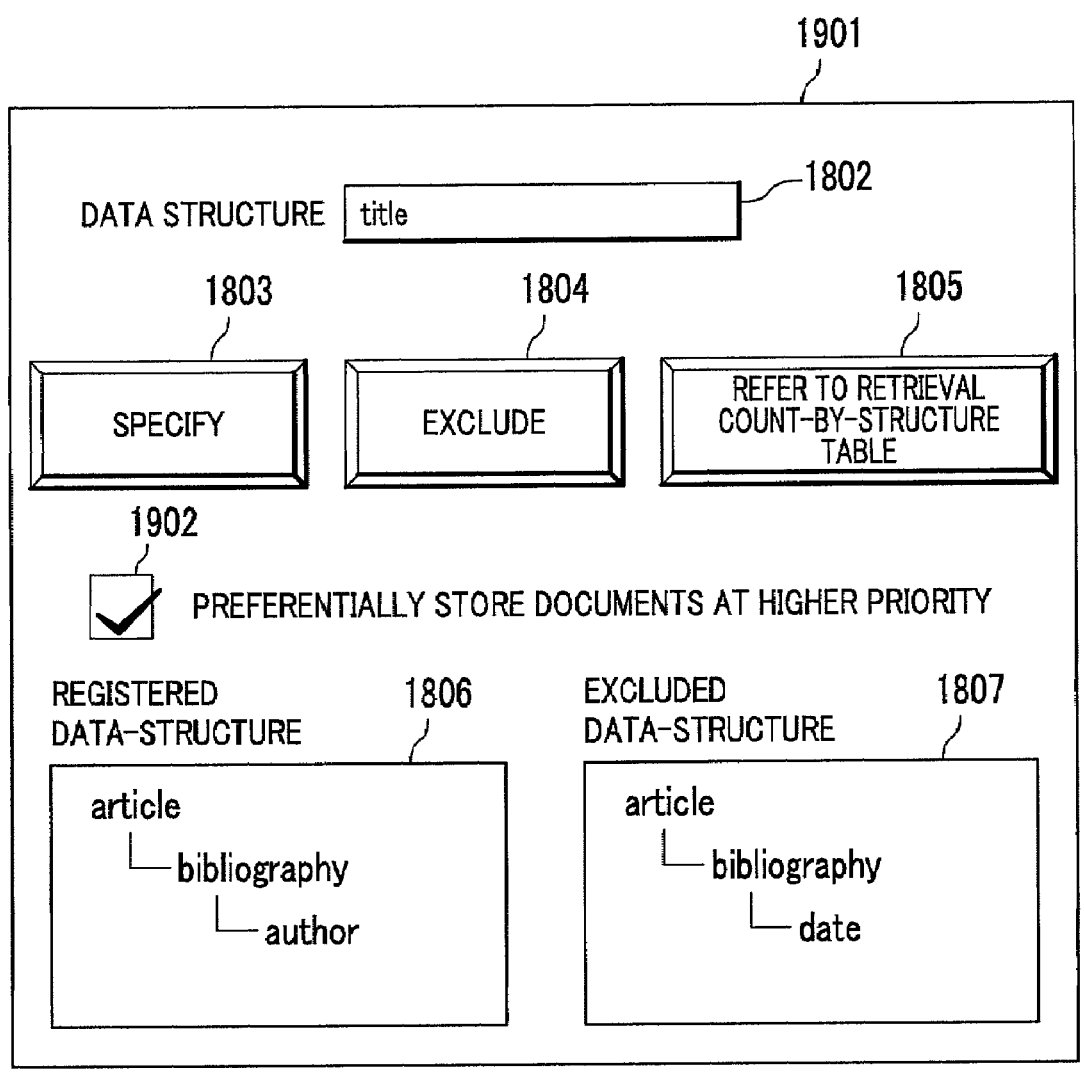
FIG. 19 shows a GUI according to the fourth embodiment.

As shown in FIG. 19, the a document at higher priorities storage check box 1902 is checked, by which important documents at higher priorities are specified to be stored into the partial document storage area 140. In FIG. 17, the explanations have been given in which hit counts for each document is counted, and target documents are sorted based on the hit counts of the document in the descending order from more to less hit counts, and the structures of each document that are specified by the user, in the descending order into the partial document storage area 140. Instead of the above case, as shown in FIG. 19, it may be possible for the user to check the important document storage check box 1902, so as to preferentially load documents at higher priorities into the partial document storage area 140. For example, the user may handle documents that include more words used as a query as important documents when he or she retrieves the documents. It may also be possible that the user may specify those important documents through other displays. Furthermore, It may also be possible that the user may specify those documents having more counts or later dates of references as an important document, by managing those counts and dates of the documents.

As described above, the fourth embodiment of the present invention has been explained.

As explained above, the fourth embodiment focuses on important documents that are usable for a user, and store an entire of a structure of each important document that is frequently retrieved onto a main internal memory, thereby realizing a high speed retrieval performance of a document retrieval system.

The first through fourth embodiments of the present invention have been explained in such a case in which partial documents are stored from a magnetic disk device onto a storage media such as a main internal memory on which data is readable faster than the magnetic disk device. However, storage media to which the present invention is applicable is not limited thereto, and may include plural types of storage media operating at different speed. According to the first through fourth embodiments of the present invention, the document retrieval system employs such a configuration in which the system is connected with a client via networks so as to perform various retrieval processes based on commands inputted from the client, and the system also sends back results of the retrieval processes to the client. However, the document retrieval system may also employ such a configuration in which the document retrieval system includes an input and output devices, and commands are inputted via the input device and various results are outputted from the output device.

The document retrieval system according to the present invention works effectively on such a case that retrieve documents constituted by structured data such as XML documents or electric mails, in particular, when retrieving part of those documents. Accordingly, even if available memory capacity is limited, a high speed retrieval performance can be realized without adding further memory capacity.

What is claimed is:

1. A method for retrieving documents, carried out by one or more computers,
    the method using a system retrieving documents, the system including a receive unit adapted to receive a query condition about retrieving documents specified by a user; a document retrieval computing-apparatus adapted to retrieve documents based on the received query condition; and an output unit adapted to output a result from retrieving the documents,
    with the document retrieval computing-apparatus having:
    a first storage unit;
    a second storage unit; and
    a processing unit;
    the second storage unit storing documents to be retrieved, and
    where data of the stored documents being readable by the processing unit faster from the first storage unit, than from the second storage unit,
    the method for retrieving documents comprising:
    in a loading operation on the first storage unit,
    acquiring a size of an available data storage capacity currently unused on the first storage unit, and a number of documents stored on the second storage unit, and calculating a size of a data storage portion of the available data storage capacity, to allocate to each document of the number of documents,
    extracting partial data for each document, with a size of the partial data being commensurate with a size of the data storage portion allocated to each document; and
    storing the extracted partial data as a partial document of each target document, onto the first storage unit,
    in a retrieval operation,
    performing a first retrieval of the partial documents stored on the first storage unit, thereby extracting documents that meet the query condition,
    for those documents that are determined not to meet the query condition based on a result from the first retrieval,
    performing a second retrieval of the documents to be retrieved stored on the second storage unit, thereby extracting documents that meets the query condition from the documents to be retrieved stored on the second storage unit, and
    outputting through the output unit, as results from the first and second retrievals, the documents to be retrieved that are determined to meet the query condition as hit documents, which are extracted through the first and second retrievals.

2. A method for retrieving documents, carried out by one or more computers,
    the method using a system retrieving documents, the system including a receive unit adapted to receive a query condition about retrieving documents specified by a user; a document retrieval computing-apparatus adapted to retrieve documents based on the received query condition; and an output unit adapted to output a result from retrieving the documents,
    with the document retrieval computing-apparatus having:
    a first storage unit;
    a second storage unit; and
    a processing unit;
    the second storage unit storing documents to be retrieved, and
    where data of the stored documents being readable by the processing unit faster from the first storage unit, than from the second storage unit,
    the method for retrieving documents comprising:
    in a loading operation on the first storage unit,
    acquiring a size of an available data storage capacity currently unused on the first storage unit, and a number of documents stored on the second storage unit, and calculating a size of a data storage portion of the available data storage capacity, to allocate to each document of the number of documents,
    extracting partial data from each document, with a size of the partial data being commensurate with a size of the data storage portion allocated to each document, and
    storing the extracted partial data as a partial document of each target document, onto the first storage unit,
    in a retrieval operation,
    performing a first retrieval of the partial documents stored on the first storage unit, thereby extracting documents that meet the query condition,
    for those documents that are determined not to meet the query condition based on a result from the first retrieval, performing a second retrieval of the documents to be retrieved stored on the second storage unit, thereby extracting documents that meets the query condition from the documents to be retrieved stored on the second storage unit, and
    outputting through the output unit, as results from the first and second retrievals, the documents to be retrieved that are determined to meet the query condition as hit documents, which are extracted through the first and second retrievals,
    wherein,
    by using the processing unit,
    calculating the size of the data storage portion of the available data storage capacity to allocate per partial document by dividing the available data storage capacity by the number of the documents to be retrieved.

3. The method according to claim 1, comprising:
    in the receive unit,
    receiving the query condition regarding a structure of the documents to be retrieved;

in the first storage unit, storing structure storage-type location information regarding storage location of every structure of each document to be retrieved; and in the processing unit, referring to the structure storage-type location information and performing the first retrieval on the document to be retrieved if the document is determined to include a structure specified in the query condition which is stored on the first storage unit, and referring to the structure storage-type location information and performing the second retrieval on the document to be retrieved if the document is determined to include the structure specified in the query condition which is not stored on the first storage unit, or if the document is determined to include no structure that meets the query condition.

4. The method according to claim 2, comprising:

in the input unit, receiving the query condition regarding structure of the documents to be retrieved;

in the first storage unit, storing structure storage-type location information regarding storage location of every structure of each document to be retrieved; and in the processing unit, referring to the structure storage-type location information and performing the first retrieval on the document to be retrieved if the document is determined to include a structure specified in the query condition which is stored on the first storage unit, and referring to the structure storage-type location information and performing the second retrieval on the document to be retrieved if the document is determined to include the structure specified in the query condition which is not stored on the first storage unit, or if the document is determined to include no structure that meets the query condition.

5. The method according to claim 4, comprising:

in the first storage unit, storing cross-document structure priority information defining cross-document priority of the structure of the documents; and in the processing unit, extracting data from each document to be retrieved based on the cross-document structure priority information, and storing the extracted data onto the first storage unit as a partial document, wherein information indicating existence on the first storage unit is used for structures of the documents to be retrieved which are stored on the first storage unit information indicating partial existence on the first storage unit is used for structures of the documents to be retrieved which are partially stored on the first storage unit, and information indicating no existence on the first storage unit is used for structures of the document to be retrieved which are not stored on the first storage unit, and thereby updates the cross-document structure priority information.

6. The method according to claim 5, wherein the cross-document structure priority information includes a retrieval count of a structure that is taken of, at every time specified in the query condition, and the processing unit extracts data from the documents to be retrieved which are stored on the second storage unit in a descending order of the retrieval count of the structure, and stores the extracted data onto the first storage unit.

7. The method according to claim 5, wherein the cross-document structure priority information includes at least one of information regarding registered data structures, which are those to be preferentially stored on the first storage unit, and information regarding excluded data structures which are those not to be stored on the fist storage unit, wherein the information regarding the registered data structures and the information regarding the excluded data structures are both received through the input unit, and the processing unit extracts data from the documents to be retrieved which are stored on the second storage unit, based on one of the information regarding registered data structures and the information regarding excluded structures, and stores the extracted data onto the first storage unit as the partial documents of the documents to be retrieved.

8. The method according to claim 6, wherein the cross-document structure priority information includes at least one of information regarding registered data structures, which are those to be preferentially stored on the first storage unit, and information regarding excluded data structures which are those not to be stored on the fist storage unit, wherein the information regarding the registered data structures and the information regarding the excluded data structures are both received through the input unit, and the processing unit extracts data from the documents to be retrieved which are stored on the second storage unit, based on one of the information regarding registered data structures and the information regarding excluded data structures, and stores the extracted data onto the first storage unit as the partial documents of the documents to be retrieved.

9. The method according to claim 5, wherein the cross-document structure priority information includes information regarding at least one of hit counts, retrieval counts and a latest retrieval date of the documents to be retrieved, and the processing unit determines cross-document priority of the documents to be retrieved based on the information regarding at least one of the hit counts, the retrieval counts and the latest retrieval date of the documents to be retrieved, and extracts data from the documents to be retrieved stored on the second storage unit in the descending order of the determined cross-document priority, and stores the extracted data onto the first storage unit.

10. The method according to claim 6, wherein the cross-document structure priority information includes information regarding at least one of hit counts, retrieval counts and a latest retrieval date of the documents to be retrieved, and the processing unit determines cross-document priority of the documents to be retrieved based on the information regarding at least one of the hit counts, the retrieval counts and the latest retrieval date of the documents to be retrieved, and extracts data from the documents to be retrieved stored on the second storage unit in the descending order of the determined cross-document priority, and stores, the extracted data onto the first storage unit.

11. The method according to claim 7, wherein the cross-document structure priority information includes information regarding at least one of hit counts, retrieval counts and a latest retrieval date of the documents to be retrieved, and the processing unit determines cross-document priority of the documents to be retrieved based on the information regarding at least one of the hit counts, the retrieval counts and the latest retrieval date of the documents to be retrieved, and extracts data from the documents to be retrieved stored on the second storage unit in the descending order of the determined cross-document priority, and stores the extracted data onto the first storage unit.

12. The method according to claim 8, wherein the cross-document structure priority information includes information regarding at least one of hit counts, retrieval counts and a latest retrieval date of the documents to be retrieved, and the processing unit determines cross-document priority of the documents to be retrieved based on the information regarding at least one of the hit counts, the retrieval counts and the latest retrieval date of the documents to be retrieved, and extracts data from the documents to be retrieved stored on the second storage unit in the descending order of the determined cross-document priority, and stores the extracted data onto the first storage unit.

13. A storage medium for storing programs for executing the method for retrieving documents according to one of claims 1 to 12.

14. A document retrieval computing-apparatus included in a system of retrieving documents, where the system includes the document retrieval computing-apparatus, a receive unit adapted to receive a query condition about retrieving documents specified by a user, and an output unit adapted to output results from retrieving the documents, the document retrieval computing-apparatus comprising:

a first storage unit, a second storage unit, and a processing unit, the second storage unit storing documents to be retrieved, where data of the stored documents being readable by the processing unit faster from the first storage unit, than from the second storage unit, and where the processing unit is adapted to perform operations of:

in a loading operation on the first storage unit, acquiring a size of an available data storage capacity currently unused on the first storage unit, and a number of documents stored on the second storage unit, and calculating a size of a data storage portion of the available data storage capacity, to allocate to each document of the number of documents, extracting partial data for each document, with a size of the partial data being commensurate with a size of the data storage portion allocated to each document, and storing the extracted partial data as partial documents of the documents to be retrieved, onto the first storage unit, and in a retrieval operation, performing a first retrieval of the partial documents stored on the first storage unit, thereby extracting the documents that meet the query condition, for the documents that are determined not to meet the query condition based on a result from the first retrieval, performing a second retrieval of the documents to be retrieved stored on the second storage unit, thereby extracting the documents that meet the query condition from the documents to be retrieved stored on the second storage unit, and outputting through the output unit, as results from the first and second retrievals, the documents to be retrieved that are determined to meet the query condition as hit documents, which are extracted through the first and second retrievals.

15. The document retrieval computing-apparatus according to claim 14, wherein the input unit is adapted to receive the query condition regarding a structure of the documents to be retrieved, the first storage unit is adapted to store structure storage location information regarding storage location of every structure of each target documents to be retrieved, and the processing unit is adapted to refer to the structure storage-type location information, and perform the first retrieval for those documents that are determined to include the structure specified in the query condition which is stored on the first storage unit, and the processing unit is further adapted to refer to the structure storage-type location information, and perform the second retrieval for those documents that are determined to include the structure specified in the query condition that is not stored on the first storage unit, or that are determined not to include no structure that meets the query condition.

16. The document retrieval computing-apparatus according to claim 15, wherein, the first storage unit is adapted to store structure priority information defining priority of the structure of the documents, the processing unit is adapted to extract data from each target document based on the structure priority information, and store the extracted data onto the first storage unit as a partial document, wherein information indicating existence on the first storage unit is used for structure of the documents to be retrieved which are stored on the first storage unit information indicating partial existence on the first storage unit is used for structures of the documents to be retrieved which are partially stored on the first storage unit, and information indicating no existence on the first storage unit is used for structures of the document to be retrieved which are not stored on the first storage unit, thereby updating the structure priority information.

* * * * *